US012263681B2

(12) United States Patent
Kimoto

(10) Patent No.: US 12,263,681 B2
(45) Date of Patent: Apr. 1, 2025

(54) IMAGE RECORDING APPARATUS, SYSTEM, AND METHOD TO PERFORM PROPER CHARGING AFTER CARTRIDGE REPLACEMENT

(71) Applicant: BROTHER KOGYO KABUSHIKI KAISHA, Nagoya (JP)

(72) Inventor: Taichiro Kimoto, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 118 days.

(21) Appl. No.: 18/052,279

(22) Filed: Nov. 3, 2022

(65) Prior Publication Data

US 2023/0166514 A1 Jun. 1, 2023

(30) Foreign Application Priority Data

Nov. 29, 2021 (JP) ................................ 2021-193028

(51) Int. Cl.
*B41J 2/175* (2006.01)
*B41J 2/085* (2006.01)
*B41J 2/14* (2006.01)

(52) U.S. Cl.
CPC ........... *B41J 2/17506* (2013.01); *B41J 2/085* (2013.01); *B41J 2/14024* (2013.01); *B41J 2/17546* (2013.01); *B41J 2002/17569* (2013.01)

(58) Field of Classification Search
CPC .... B41J 2/17506; B41J 2/085; B41J 2/14024; B41J 2/17546; B41J 2002/17569; G06Q 30/06; H04N 1/34; G06F 3/1285
See application file for complete search history.

(56) References Cited

U.S. PATENT DOCUMENTS 12,011,932 B2 * 6/2024 Azechi ................ G03G 15/556
2021/0178772 A1 6/2021 Sahara

FOREIGN PATENT DOCUMENTS

JP 2021-94705 A 6/2021

* cited by examiner

*Primary Examiner* — Geoffrey S Mruk
(74) *Attorney, Agent, or Firm* — Merchant & Gould P.C.

(57) ABSTRACT

An image recording apparatus includes a controller configured to make a transition of an operational mode of the controller between a first mode and a second mode. The first mode represents an operational state where a contract for a service using a first cartridge has been made. The second mode represents an operational state where the contract for the contract for the service has not been made. In the first mode, the controller stores a first tank liquid volume and a second tank liquid volume in a memory. The first tank liquid volume represents, when the first cartridge is attached to an attachment case, an amount of liquid supplied from the first cartridge and stored in a tank. The second tank liquid volume represents, when a second cartridge is attached to the attachment case, an amount of liquid supplied from the second cartridge and stored in the tank.

9 Claims, 14 Drawing Sheets

IMAGE RECORDING APPARATUS, SYSTEM, AND METHOD TO PERFORM PROPER CHARGING AFTER CARTRIDGE REPLACEMENT

REFERENCE TO RELATED APPLICATIONS

This application claims priority from Japanese Patent Application No. 2021-193028 filed on Nov. 29, 2021. The entire content of the priority application is incorporated herein by reference.

BACKGROUND ART

A user of a printer may sign a contract with a vendor of the printer and use the printer in accordance with the signed contract. For instance, the user may make a contract in which the user is allowed to use ink free of charge until the number of printed sheets reaches a particular number (hereinafter referred to as the contracted number of printable sheets) in exchange for payment. Under this contract, when a remaining amount of ink in the printer runs low, a new cartridge with ink stored is sent by the vendor to the user. The user is not charged for ink or cartridges as long as the number of printed sheets is equal to or less than the contracted number of printable sheets.

An image recording apparatus has been known that includes a removably attachable tank with ink stored and a sub tank. In the image recording apparatus, when the tank attached does not meet particular conditions, the ink is not replenished from the tank to the sub tank. Meanwhile, when the tank attached meets the particular conditions, the ink is replenished from the tank to the sub tank.

DESCRIPTION

Suppose for instance that a user of a printer that has a cartridge removably attached and a sub tank signs a contract in which the user is allowed to use ink free of charge until the number of printed sheets reaches the contracted number of printable sheets. Until the user signs the contract, the user purchases commercial cartridges and performs printing with ink stored in the commercial cartridges. After having signed the contract, the user performs printing with ink stored in cartridges (hereinafter referred to as contract cartridges) sent by the vendor.

The user, after having signed the contract, replaces the commercial cartridge attached to the printer with the contract cartridge. At the time of the cartridge replacement, ink supplied from the commercial cartridge still remains in the sub tank. After the cartridge replacement, the sub tank contains the ink supplied from the commercial cartridge and ink supplied from the contract cartridge. In this case, the user performs printing using both the inks supplied from the different types of cartridges.

Of the inks stored in the sub tank, the user has already paid for the ink supplied from the commercial cartridge. Therefore, if the printer performs a charging process (e.g., counting the number of printed sheets) according to the contract from just after the cartridge replacement, the user will suffer economical disadvantages for the amount of the ink supplied from the commercial cartridge.

Aspects of the present disclosure are advantageous to provide one or more improved techniques to prevent a user of an image recording apparatus from suffering disadvantages when replacing a cartridge in a state where liquid remains in a tank.

According to aspects of the present disclosure, an image recording apparatus is provided, which includes an attachment case, a tank, a head, a memory, and a controller. The attachment case is configured to support a cartridge attached thereto of a plurality of different types of attachable cartridges. The plurality of different types of cartridges include a first cartridge and a second cartridge. The tank is configured to store liquid supplied from the cartridge attached to the attachment case. The head is connected with the tank. The head has a nozzle configured to eject the liquid. The controller is configured to make a transition of an operational mode of the controller between a first mode and a second mode. The first mode represents an operational state where a contract for a service using the first cartridge has been made. The second mode represents an operational state where the contract for the contract for the service has not been made. The controller is further configured to, in the first mode, store a first tank liquid volume and a second tank liquid volume in the memory. The first tank liquid volume represents, when the first cartridge is attached to the attachment case, an amount of liquid supplied from the first cartridge and stored in the tank. The second tank liquid volume represents, when the second cartridge is attached to the attachment case, an amount of liquid supplied from the second cartridge and stored in the tank.

According to aspects of the present disclosure, further provided is a system including an image recording apparatus, and a server connected with the image recording apparatus. The image recording apparatus includes an attachment case, a tank, a head, a memory, and a controller. The attachment case is configured to support a cartridge attached thereto of a plurality of different types of attachable cartridges. The plurality of different types of cartridges include a first cartridge and a second cartridge. The tank is configured to store liquid supplied from the cartridge attached to the attachment case. The head is connected with the tank. The head has a nozzle configured to eject the liquid. The memory stores a charging flag settable to any one of a first value and a second value. The controller is configured to make a transition of an operational mode of the controller between a first mode and a second mode. The first mode represents an operational state where a contract for a service using the first cartridge has been made. The second mode represents an operational state where the contract for the contract for the service has not been made. The controller is further configured to, in the first mode, store a first tank liquid volume and a second tank liquid volume in the memory. The first tank liquid volume represents, when the first cartridge is attached to the attachment case, an amount of liquid supplied from the first cartridge and stored in the tank. The second tank liquid volume represents, when the second cartridge is attached to the attachment case, an amount of liquid supplied from the second cartridge and stored in the tank. The controller is further configured to, in the first mode, in response to receiving an instruction to cause the head to eject the liquid from the nozzle, update the first tank liquid volume and the second tank liquid volume, and set the charging flag to one of the first value and the second value. The controller is further configured to perform a first charging process in response to the charging flag being set to the first value. The server is configured to perform a second charging process in response to the controller of the image recording apparatus performing the first charging process.

According to aspects of the present disclosure, further provided is a method implementable using an image recording apparatus and a server connected with the image recording apparatus. The method includes making, by a controller of the image recording apparatus, a transition of an operational mode of the controller between a first mode and a second mode. The first mode represents an operational state where a contract for a service using a first cartridge has been made. The second mode represents an operational state where the contract for the contract for the service has not been made. The method further includes storing, by the controller when in the first mode, a first tank liquid volume and a second tank liquid volume in a memory. The first tank liquid volume represents, when the first cartridge is attached to an attachment case, an amount of liquid supplied from the first cartridge and stored in a tank. The second tank liquid volume represents, when a second cartridge is attached to the attachment case, an amount of liquid supplied from the second cartridge and stored in the tank. The method further includes, by the controller when in the first mode, in response to receipt of an instruction to cause a head to eject liquid from a nozzle, updating the first tank liquid volume and the second tank liquid volume, and setting a charging flag to one of a first value and a second value. The method further includes performing, by the controller, a first charging process in response to the charging flag being set to the first value. The method further includes performing, by the server, a second charging process in response to the controller performing the first charging process. The image recording apparatus includes the attachment case, the tank, the head, the memory, and the controller. The attachment case is configured to support a cartridge attached thereto of a plurality of different types of attachable cartridges. The plurality of different types of cartridges includes the first cartridge and the second cartridge. The tank is configured to store liquid supplied from the cartridge attached to the attachment case. The head is connected with the tank. The head has the nozzle configured to eject the liquid. The memory stores the charging flag settable to any one of the first value and the second value.

Figure 6:
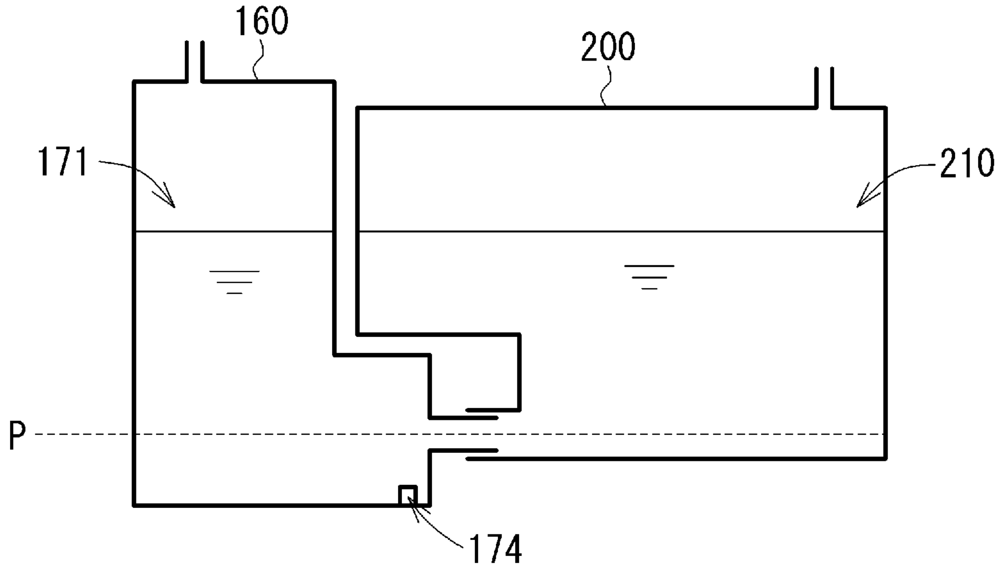

FIG. 6 schematically shows the cartridge and a sub tank communicated with each other.

Figure 7:
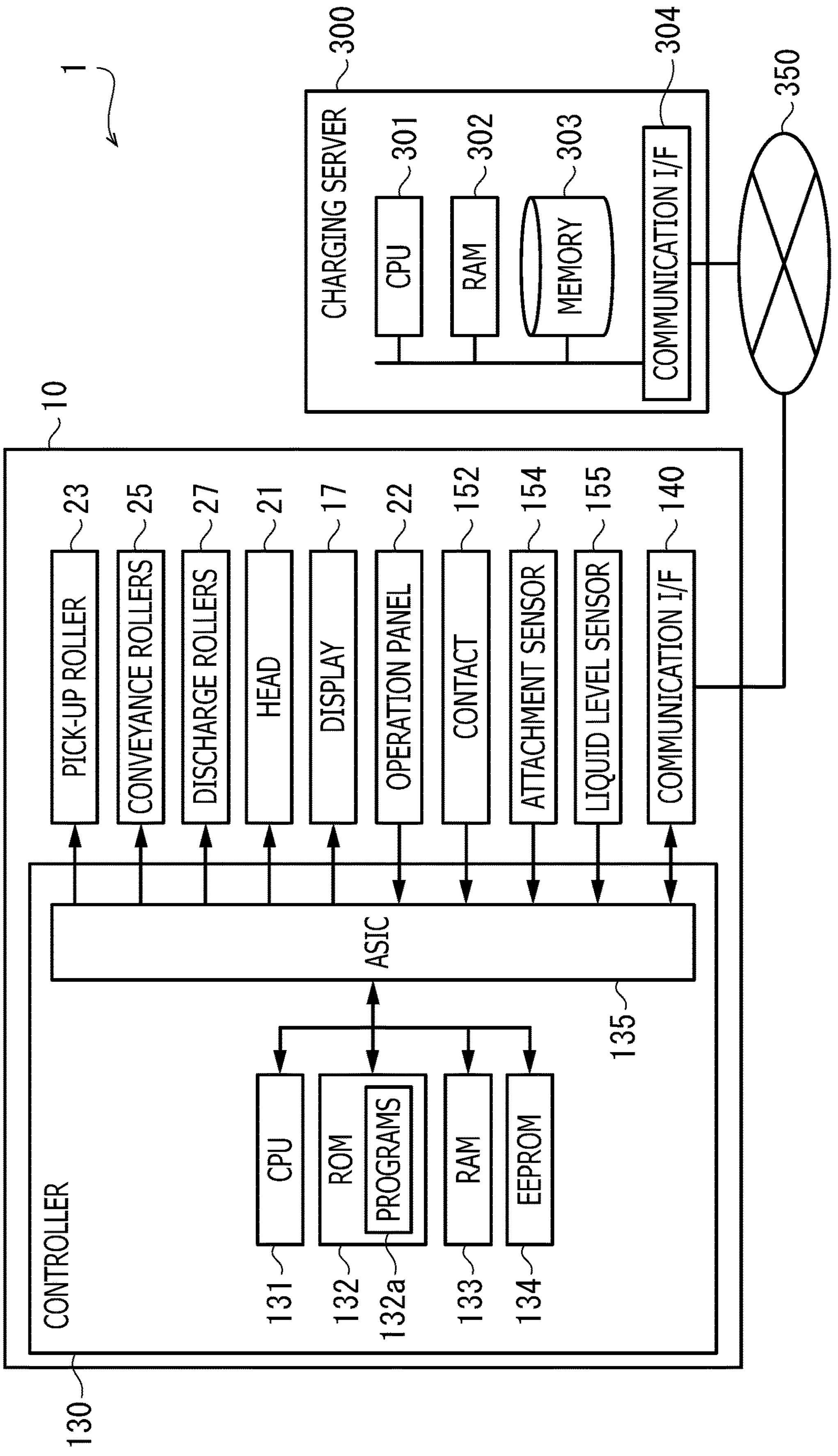

FIG. 7 is a block diagram showing a configuration of a system including the printer and a charging server interconnected via a communication network.

Figure 8:
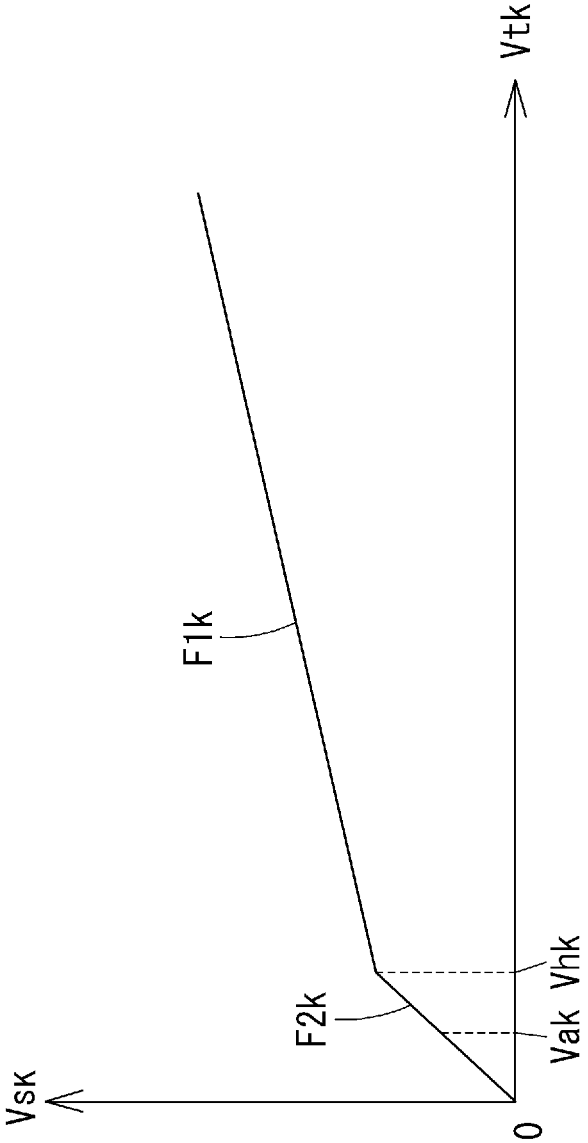

FIG. 8 shows functions F1*k* and F2*k* representing a correspondence relationship between a total ink volume Vtk of black ink in the printer and an ink volume Vsk in a black sub tank of the printer.

Figure 9A:
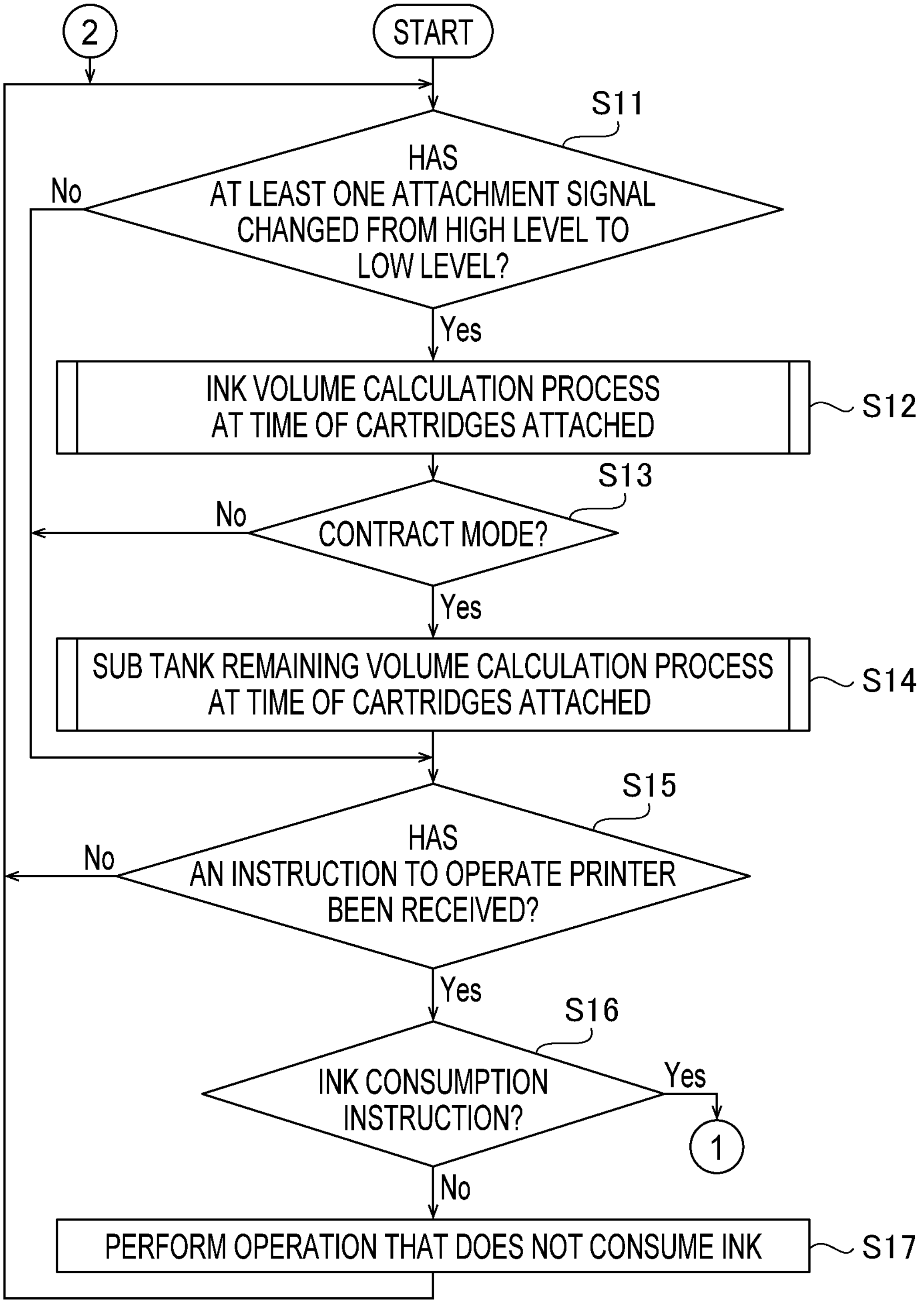
Figure 9B:
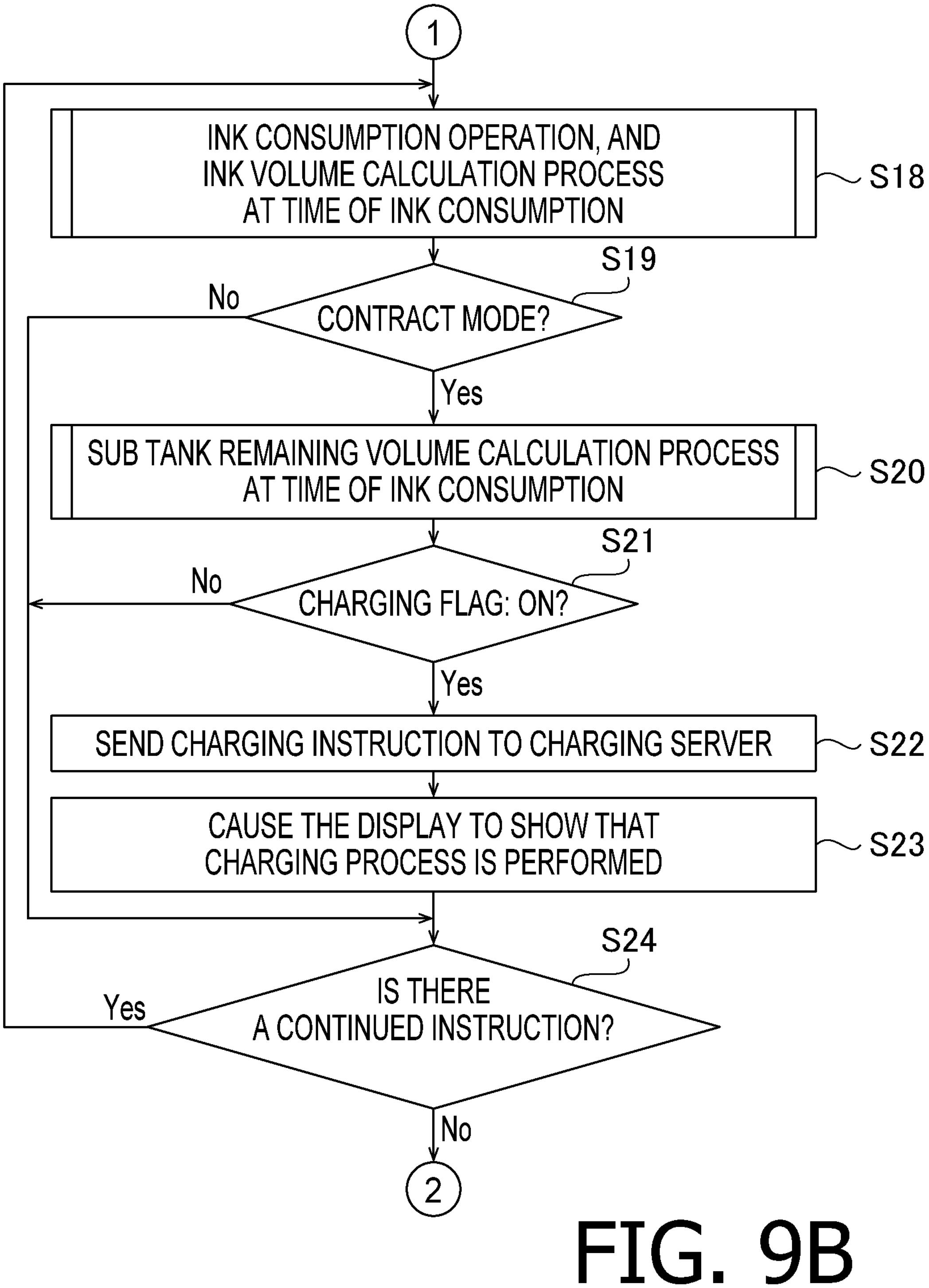

FIGS. 9A and 9B are flowcharts showing a procedure of operations by a controller of the printer.

Figure 10:
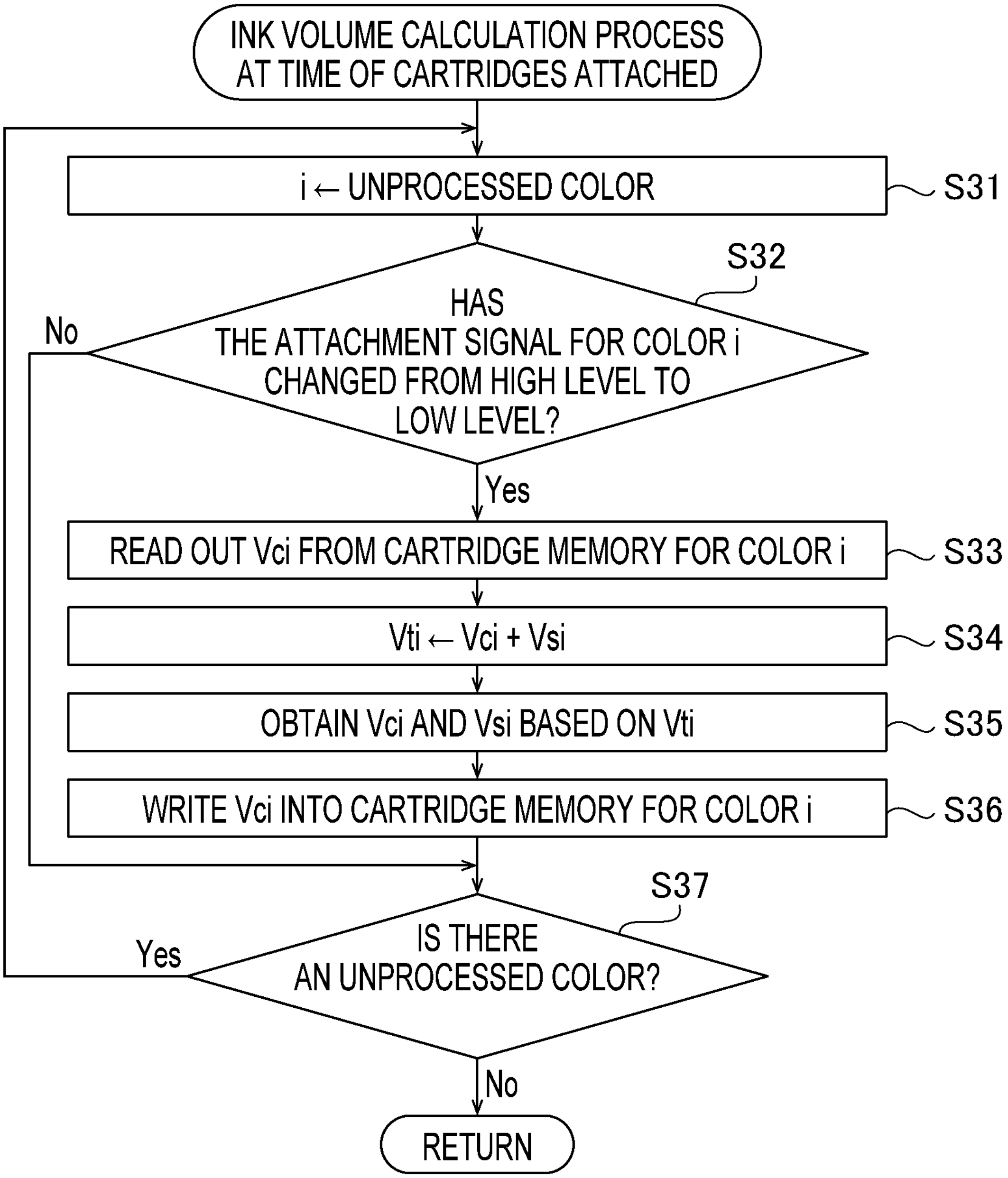

FIG. 10 is a flowchart showing a procedure of an ink volume calculation process at time of cartridges attached.

Figure 11:
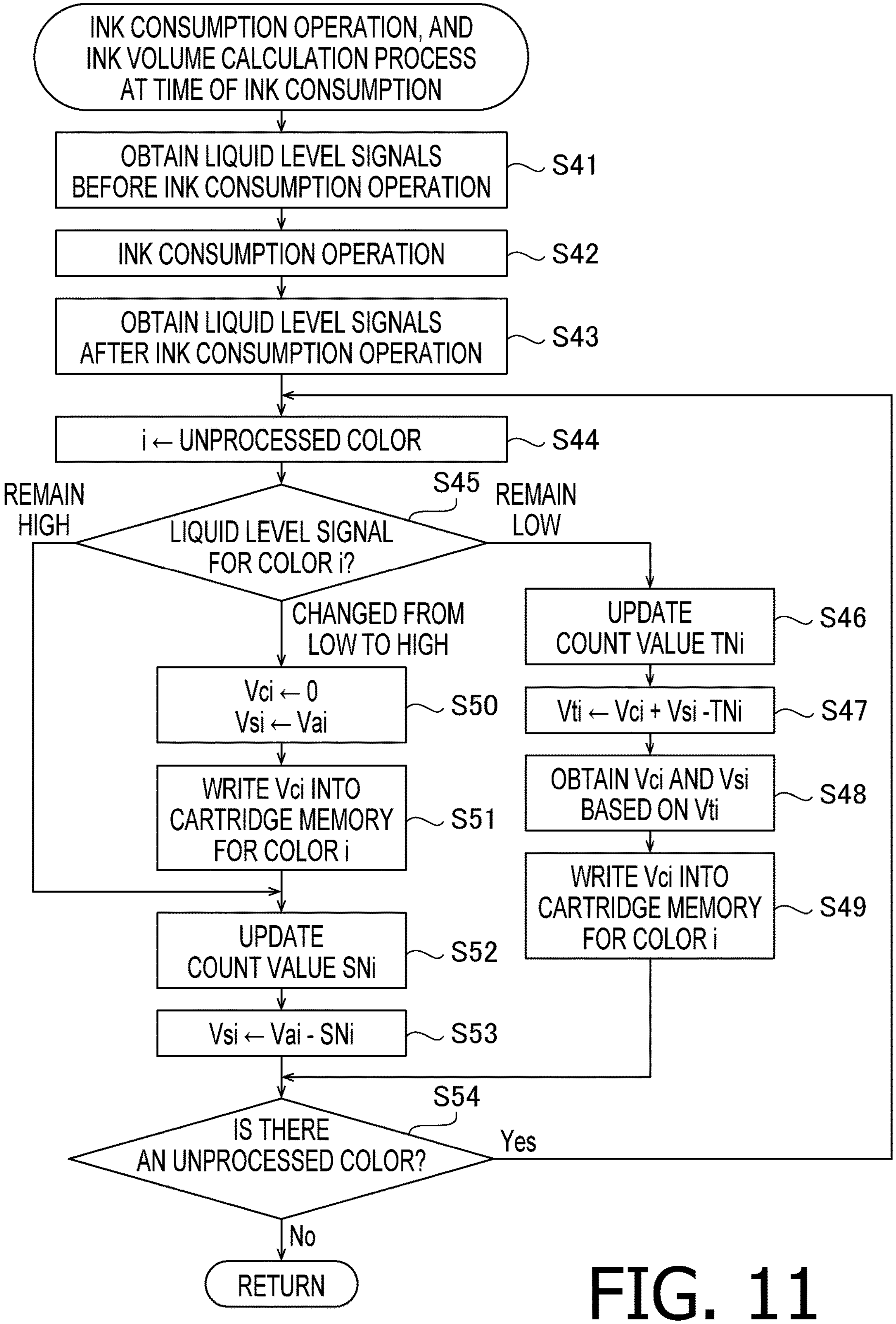

FIG. 11 is a flowchart showing a procedure of an ink consumption operation and an ink volume calculation process at time of ink consumption.

Figure 12:
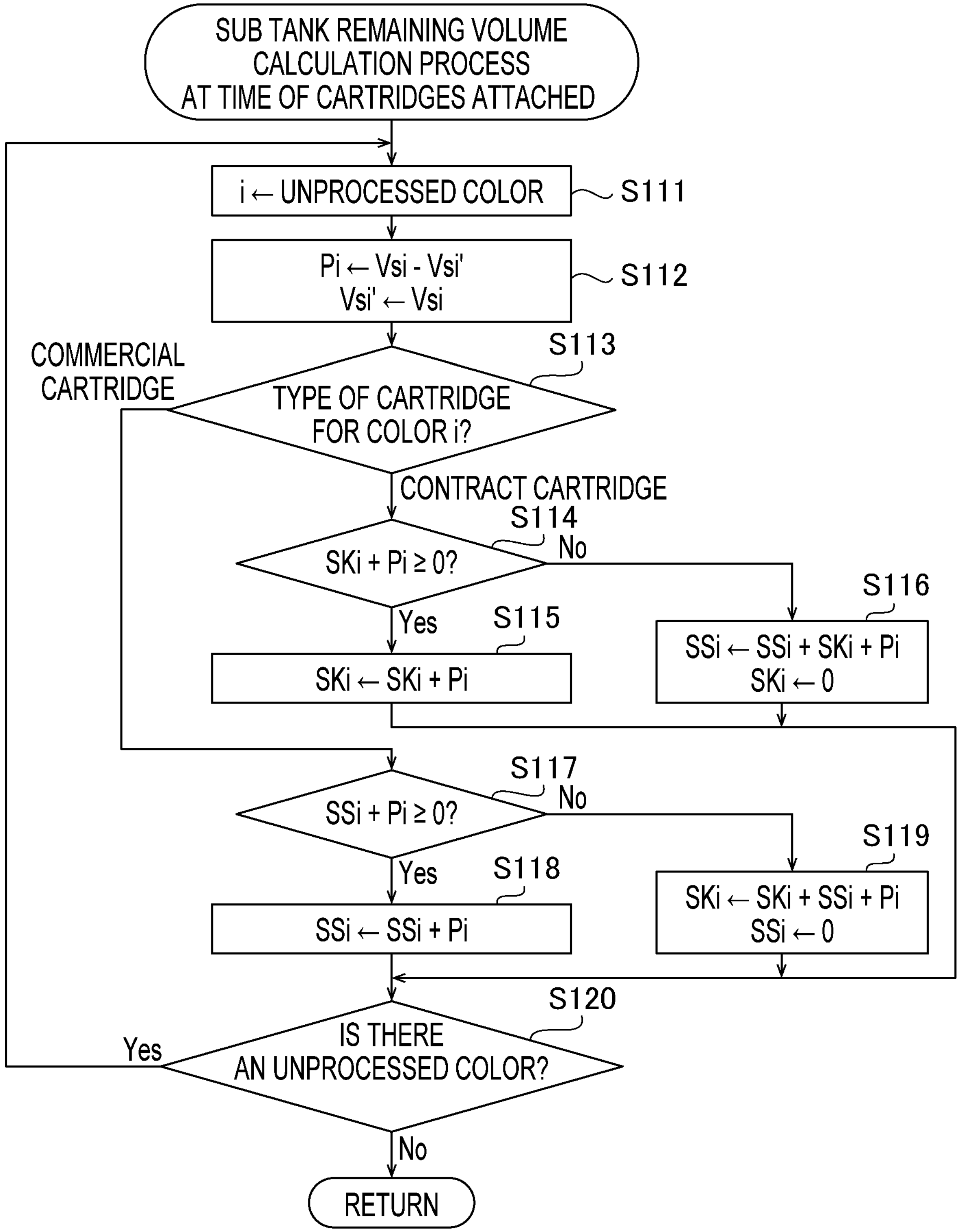

FIG. 12 is a flowchart showing a procedure of a sub tank remaining volume calculation process at time of cartridges attached.

Figure 13:
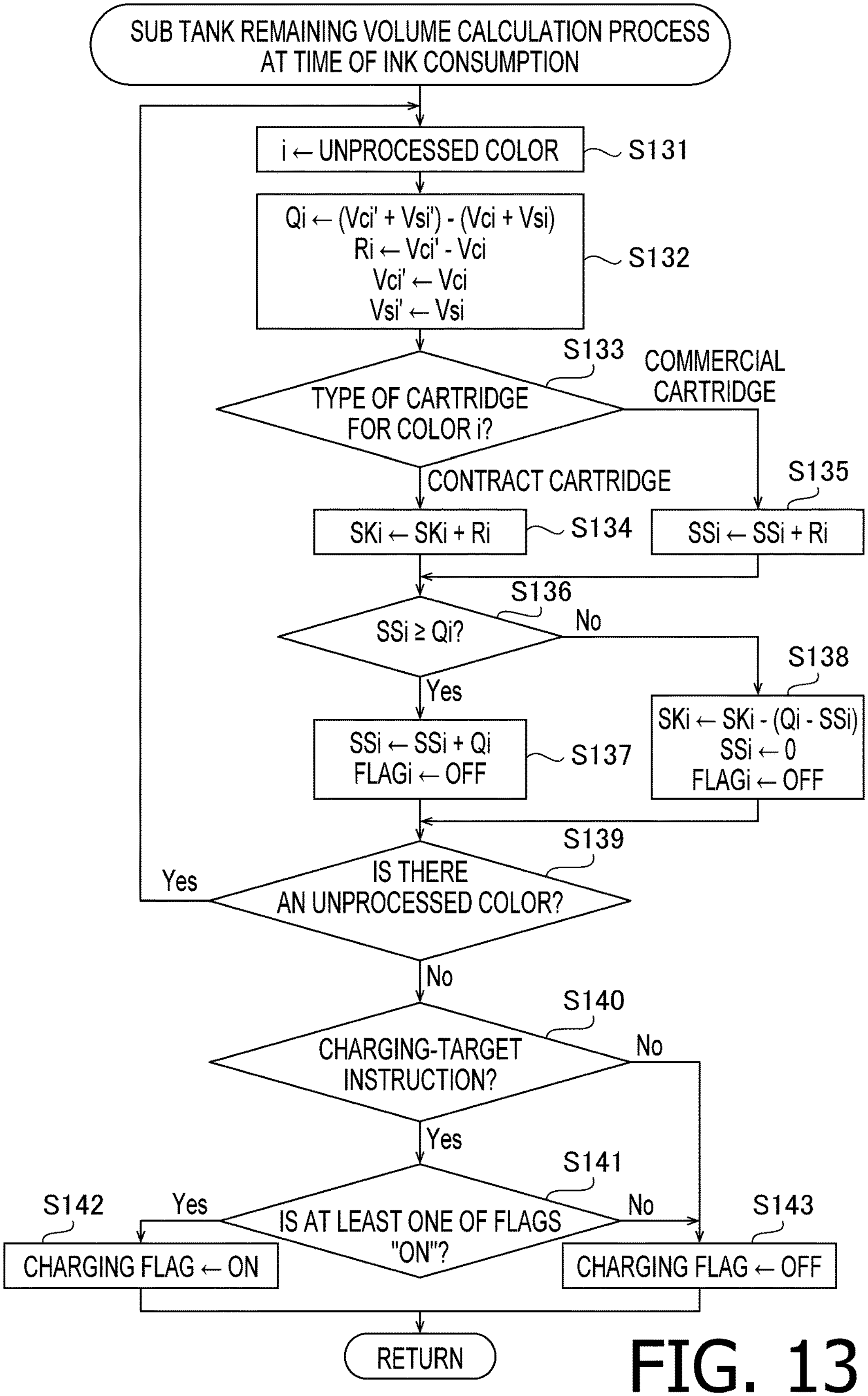

FIG. 13 is a flowchart showing a procedure of a sub tank remaining volume calculation process at time of ink consumption.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings. It is to be understood, needless to say, that the illustrative embodiment described below is merely one example in which aspects of the present disclosure are embodied and that aspects of the present disclosure are capable of use in various other combinations and environments and are capable of changes or modifications within the scope of the inventive concept as expressed herein. A vertical direction 7 is defined on a basis of a usage posture in which a printer 10 is installed on a horizontal surface to be ready for use. A front-rear direction 8 is defined with a surface, in which an opening 13 of the printer 10 is formed, as a front face. A left-right direction 9 is defined on a basis of left and right sides when the printer 10 is viewed from the front. In the illustrative embodiment, in the usage posture of the printer 10, the front-rear direction 8 and the left-right direction 9 are horizontal directions orthogonal to the vertical direction 7, and are orthogonal to each other. It is noted that each of the directions 7, 8, and 9 may represent two different directions along each direction. Namely, the "vertical direction 7" may represent two different directions (i.e., the upward and downward directions) along the vertical direction 7, and may be represented as the "vertical direction(s) 7." Likewise, the "front-rear direction 8" may represent two different directions (i.e., the frontward and rearward directions) along the front-rear direction 8, and may be represented as the "front-rear direction(s) 8." The "left-right direction 9" may represent two different directions (i.e., the leftward and rightward directions) along the left-right direction 9, and may be represented as the "left-right direction(s) 9."

[Overview of Printer]

The printer 10 of the illustrative embodiment is an example of an image recording apparatus configured to record an image of a sheet using an inkjet recording method. The printer 10 has a housing 14 formed substantially in a rectangular shape. The printer 10 may be a so-called "multi-function peripheral" having a plurality of functions such as a facsimile function, a scanning function, and a copy function, as well as a printing function.

Figure 1A:
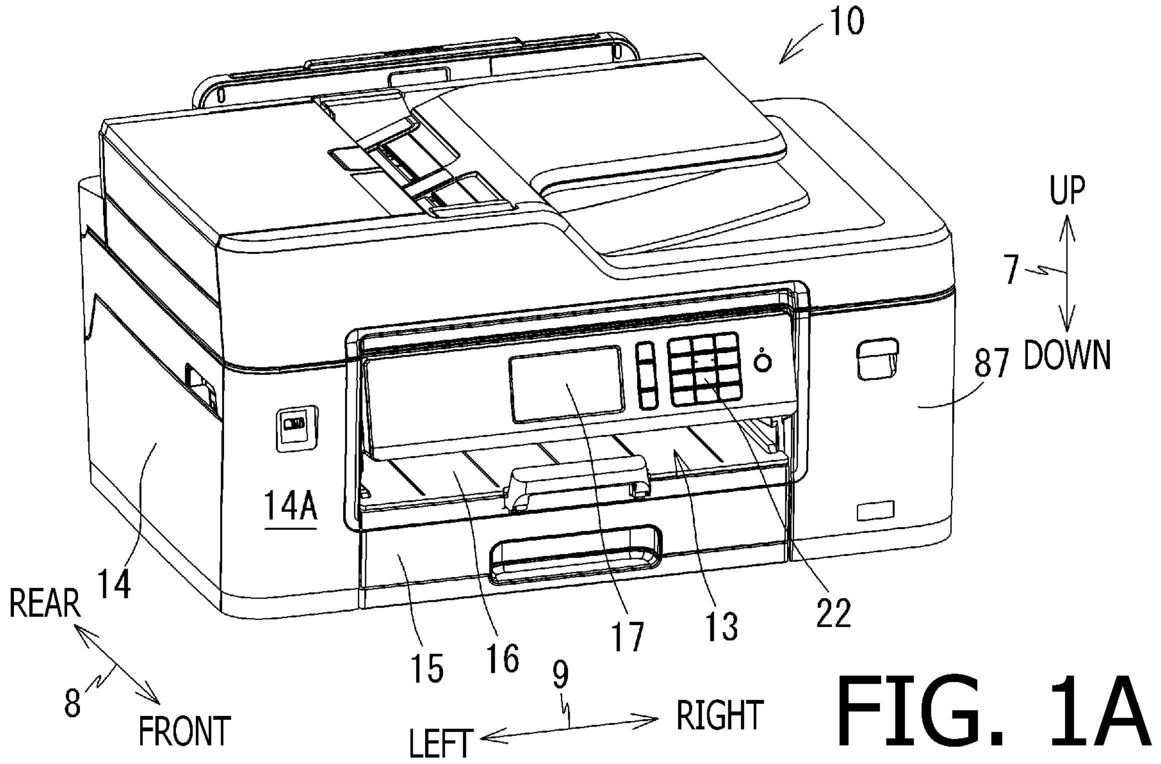
FIG. 1A is an external perspective view of a printer with a cover in a covering position.
Figure 1B:
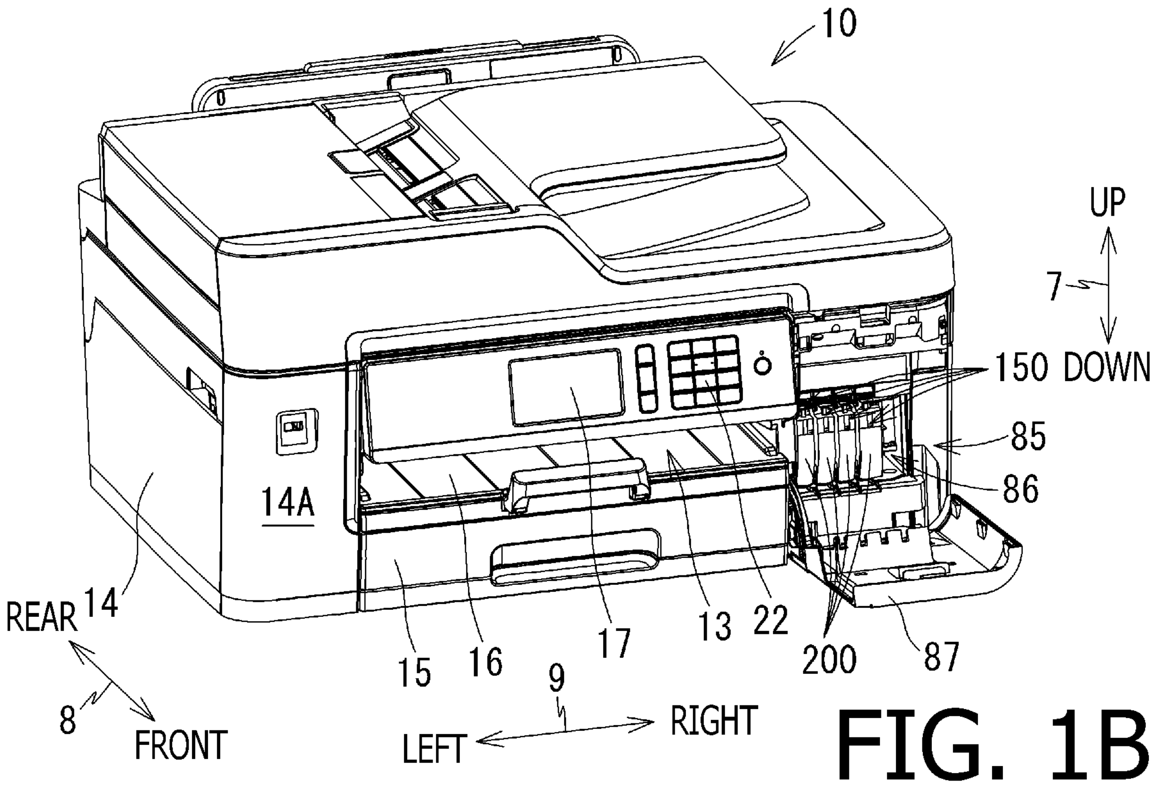
FIG. 1B is an external perspective view of the printer with the cover in an exposure position.
Figure 2:
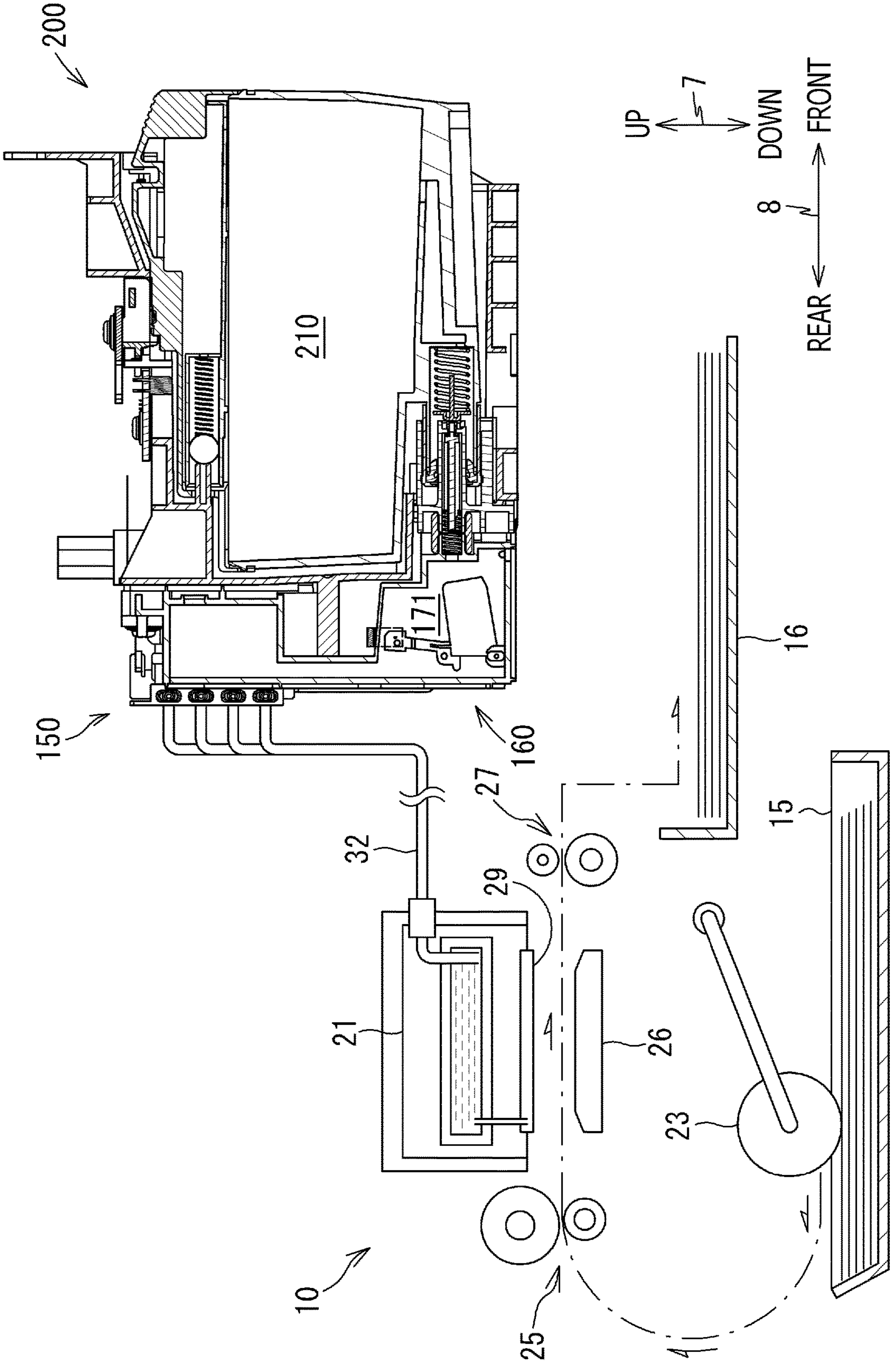
FIG. 2 is a cross-sectional side view schematically showing an internal configuration of the printer.

As shown in FIGS. 1A, 1B, and 2, the housing 14 contains therein a feed tray 15, a pick-up roller 23, conveyance rollers 25, a head 21 with a plurality of nozzles 29, a platen 26 facing the head 21 in the vertical direction 7, discharge rollers 27, a discharge tray 16, attachment cases 150 to which cartridges 200 are removably attached, and tubes 32 through which the head 21 is communicated with the cartridges 200 attached to the attachment cases 150.

The printer 10 drives the pick-up roller 23 and the conveyance rollers 25, thereby conveying a sheet supported on the feed tray 15 to a position of the platen 26. Next, the printer 10 causes the head 21 to eject, from the nozzles 29, ink supplied through the tubes 32 from the cartridges 200 attached to the attachment cases 150. Thus, ink droplets land on the sheet supported on the platen 26, and an image is formed on the sheet. The printer 10 drives the discharge rollers 27, thereby discharging onto the discharge tray 16 the sheet with the image recorded thereon.

The head 21 may be mounted on a carriage configured to reciprocate along a main scanning direction that intersects a sheet conveyance direction in which the sheet is conveyed by the conveyance rollers 25. The printer 10 may cause the head 21 to eject ink through the nozzles 29 in the process of moving the carriage from one side to the other in the main scanning direction. Thereby, an image is recorded in some area of the sheet facing the head 21. Subsequently, the printer 10 may cause the conveyance rollers 25 to convey the sheet in such a manner that a next image-recorded area (in which an image is to be next recorded) of the sheet faces the head 21. Thus, the printer 10 may be configured to record an image on a single sheet by performing the above processes alternately and repeatedly.

[Cover]

As shown in FIGS. 1A and 1B, an opening 85 is formed at a right end portion, in the left-right direction 9, of a front face 14A of the housing 14. The housing 14 further includes a cover 87. The cover 87 is configured to rotate between a covering position (i.e., a position shown in FIG. 1A) to close the opening 85 and an exposure position (i.e., a position shown in FIG. 1B) to open the opening 85. For instance, near a lower end of the housing 14 in the vertical direction 7, the cover 87 is supported by the housing 14, to be rotatable around a rotational axis along the left-right direction 9. Four attachment cases 150 are disposed in a housing space inside the housing 14 that extends behind the opening 85.

[Attachment Cases]

The printer 10 has the four attachment cases 15 corresponding to four colors of black, yellow, cyan, and magenta. To each attachment case 150, a cartridge 200 for a corresponding one of the four colors of black, yellow, cyan, and magenta is attachable.

In the following description, when there are four elements corresponding to the four colors, an element corresponding to black may be referred to as a "black element." An element corresponding to yellow may be referred to as a "yellow element." An element corresponding to cyan may be referred to as a "cyan element." An element corresponding to magenta may be referred to as a "magenta element." Specifically, for instance, a cartridge 200 corresponding to black may be referred to as a black cartridge 200.

Figure 3:
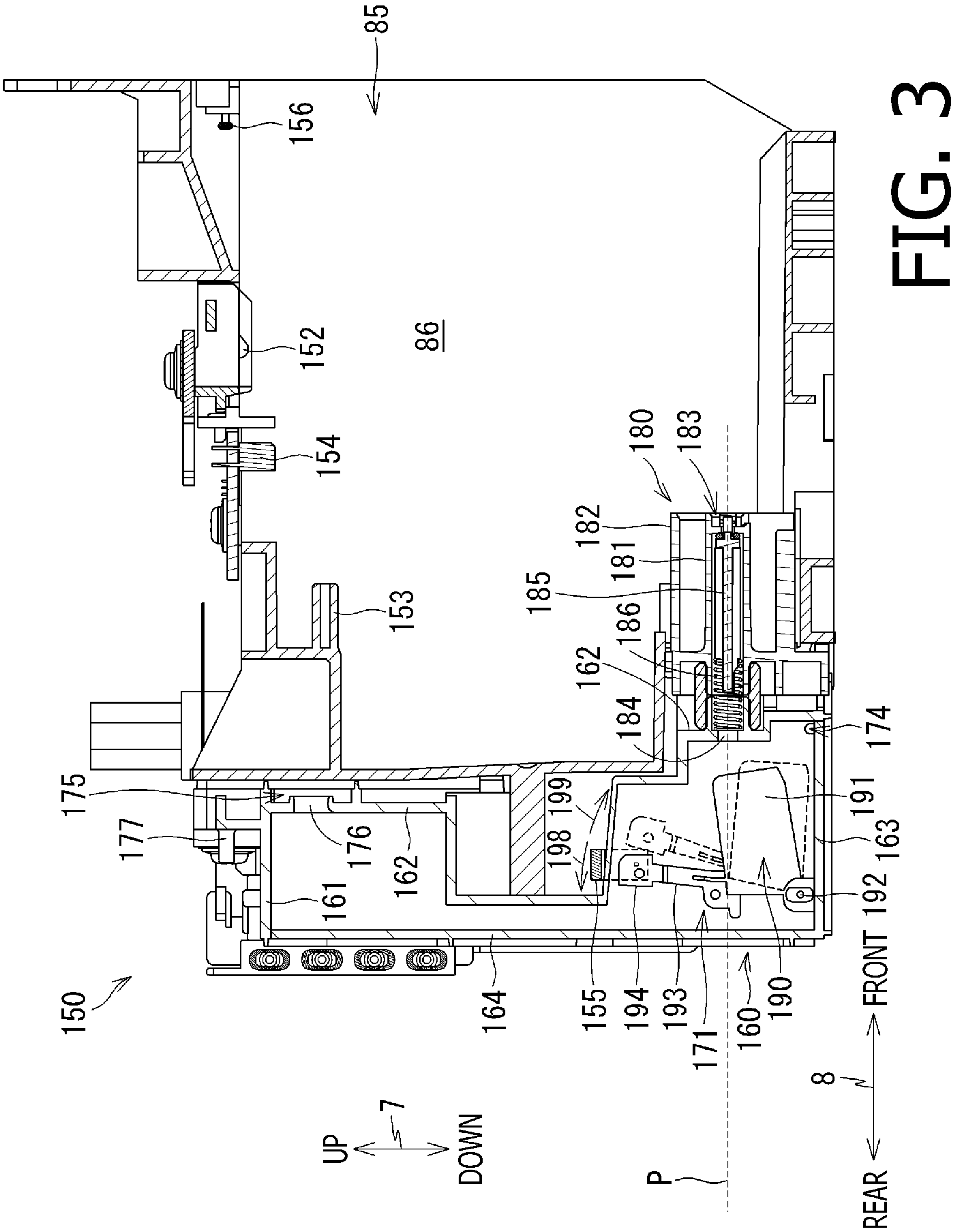
FIG. 3 is a cross-sectional side view showing an internal configuration of an attachment case.

As shown in FIG. 3, each attachment case 150 includes a contact 152, a rod 153, an attachment sensor 154, a liquid level sensor 155, and a locking pin 156. The number of the attachment cases 150 of the printer 10 is not limited to four, but may be three or less, or five or more.

By the four attachment cases 150, an internal space 86 that accommodates the four cartridges 200 is formed. The internal space 86 is defined by a top wall to define an upper end, a bottom wall to define a lower end, a rear wall to define a rear end in the front-rear direction 8, and two side walls to define two ends in the left-right direction 9. The opening 85 is positioned to face the rear wall in the front-rear direction 8. The opening 85 is configured to, when the cover 87 is in the exposure position, expose therethrough the internal space 86 for the four attachment cases 150 to the outside of the printer 10. Through the opening 85 of the housing 14, each cartridge 200 is allowed to be inserted into and pulled out of the corresponding attachment case 150.

[Contact]

The contact 152 is disposed on the top wall of each attachment case 150. The contact 152 protrudes downward from the top wall toward the internal space 86 of each attachment case 150. In a state where a cartridge 200 is attached to a corresponding attachment case 150, the contact 152 is positioned to contact an after-mentioned electrode 248 of the cartridge 200. The contacts 152 are electrically conductive, and is elastically deformable along the vertical direction 7. The contacts 152 are electrically connected with a controller 130.

[Rod]

The rod 153 protrudes forward from the back wall of each attachment case 150. On the rear wall of each attachment case 150, the rod 153 is disposed above an after-mentioned joint 180. In the process of attaching a cartridge 200 to a corresponding attachment case 150, the rod 153 is inserted into an atmosphere valve chamber 214 through an after-mentioned atmosphere communication port 221 of the cartridge 200. When the rod 153 enters the atmosphere valve chamber 214, the atmosphere valve chamber 21 is communicated with the atmosphere.

[Attachment Sensor]

The attachment sensor 154 is disposed on the top wall of each attachment case 150. Each attachment sensor 154 is used for the controller 130 to detect whether a corresponding cartridge 200 is attached to a corresponding attachment case 150. Each attachment sensor 154 includes a light emitter and a light receiver that are spaced apart from each other in the left-right direction 9. In a state where a cartridge 200 is attached to a corresponding attachment case 150, an after-mentioned light shielding rib 245 of the cartridge 200 is positioned between the light emitter and the light receiver of the attachment sensor 154. In other words, the light emitter and the light receiver of the attachment sensor 154 are opposed to each other across the light shielding rib 245 of the cartridge 200 attached to the attachment case 150.

The attachment sensor 154 is configured to output a signal (hereinafter referred to as an attachment signal) of which a level varies depending on whether the light emitted along the left-right direction 9 by the light emitter has been received by the light receiver (or how high a light intensity of the light received by the light receiver is). For instance, the attachment sensor 154 outputs a low-level attachment signal in response to the light receiver receiving the light having a light intensity lower than a threshold intensity. Further, the attachment sensor 154 outputs a high-level attachment signal in response to the light receiver receiving light having a light intensity equal to or higher than the threshold intensity. The controller 130 receives four attachment signals respectively output from the four attachment sensors 154.

[Liquid Level Sensor]

The liquid level sensor 155 is used for the controller 130 to detect whether a detected section 194 of an after-mentioned actuator 190 is in a detection position. The liquid level sensor 155 includes a light emitter and a light receiver that are spaced apart from each other in the left-right direction 9. In other words, the light emitter and the light receiver of the liquid level sensor 155 are opposed to each other across the detected section 194 located in the detection position. The liquid level sensor 155 is configured to output a signal (hereinafter referred to as a liquid level signal) of which a level varies depending on whether the light emitted by the light emitter has been received by the light receiver (or how high a light intensity of the light received by the light receiver is). For instance, the liquid level sensor 155 outputs a low-level liquid level signal in response to the light receiver receiving light having a light intensity lower than a threshold intensity. Further, the liquid level sensor 155 outputs a high-level liquid level signal in response to the light receiver receiving light having a light intensity equal to or higher than the threshold intensity. The controller 130 receives four liquid level signals respectively output from the four liquid level sensors 155.

[Locking Pin]

The locking pin 156 is a rod-shaped member that extends along the left-right direction 9 at an upper end portion of the internal space 86 of the attachment case 150 and near the opening 85. Two ends of the locking pin 156 in the left-right direction 9 are fixedly attached to the two side walls that define the left and right ends of the internal space 86 of the four attachment cases 150, respectively. The locking pin 156 extends in the left-right direction 9 in the internal space 86. Each cartridge 200, when attached to the corresponding attachment case 150, is engaged with the locking pin 156. Thereby, each cartridge 200 attached to the corresponding attachment case 150 is held in an attachment position shown in FIG. 5.

[Sub Tanks]

The printer 10 includes four sub tanks 160 corresponding to the four cartridges 200. Each sub tank 160 is disposed further rearward of the rear wall of the corresponding attachment case 150. As shown in FIG. 3, each sub tank 160 has an upper wall 161, a front wall 162, a lower wall 163, a rear wall 164, and two side walls (not shown). A liquid chamber 171 is formed inside the sub tank 160. Of the walls forming the sub tank 160, at least the wall(s), which face the liquid level sensor 155 in a traveling direction of the light emitted from the liquid level sensor 155, are light-transmissive. Therefore, the light emitted from the liquid level sensor 155 is transmitted through the wall(s) facing the liquid level sensor 155. The four sub tanks 160 have substantially the same configuration.

The liquid chamber 171 is connected with an ink flow path (not shown) through an outlet 174. A lower end of the outlet 174 is defined by the lower wall 163 that defines a lower end of the liquid chamber 171. The outlet 174 is positioned lower than a joint 180 (more specifically, a lower end of a through hole 184) in the vertical direction 7. The ink flow path communicated with the outlet 174 is communicated with a corresponding tube 32 (see FIG. 2). Therefore, the liquid chamber 171 is communicated with the head 21 from the outlet 174 through the ink flow path and the corresponding tube 32. The ink stored in the liquid chamber 171 is supplied to the head 21 from the outlet 174 through the ink flow path and the corresponding tube 32.

The liquid chamber 171 is communicated with the atmosphere through an atmosphere communication chamber 175. More specifically, the atmospheric communication chamber 175 is communicated with the liquid chamber 171 via a through hole 176 penetrating the front wall 162. The atmosphere communication chamber 175 is communicated with the outside of the printer 10 through an atmosphere communication port 177 and a tube (not shown) connected with the atmosphere communication port 177. The atmosphere communication chamber 175 is communicated with the atmosphere through the atmosphere communication port 177 and the aforementioned tube.

[Joint]

As shown in FIG. 3, the joint 180 has a needle 181 and a guide 182. The needle 181 is a tube with a flow channel formed inside. The needle 181 protrudes forward from the front wall 162 that defines a front end of the liquid chamber 171. An opening 183 is formed at a protruding end portion of the needle 181. An internal space of the needle 181 is communicated with the liquid chamber 171 via the through hole 182 penetrating the front wall 162. The guide 182 protrudes forward from the front wall 162. The guide 182 has an opening at a protruding end portion thereof.

A valve 185 and a coil spring 186 are disposed in the internal space of the needle 181. The valve 185 is movable along the front-rear direction 8 between a closed position to close the opening 183 and an open position to open the opening 183 in the internal space of the needle 181. The coil spring 186 is configured to urge the valve 185 forward, i.e., in such a direction as to move the valve 185 from the open position to the closed position.

[Actuator]

The actuator 190 is disposed in the liquid chamber 171. The actuator 190 is supported by a supporting member (not shown) disposed in the liquid chamber 171, to be rotatable in directions indicated by arrows 198 and 199. The actuator 190 is rotatable between a position indicated by a solid line and a position indicated by a dashed line as shown in FIG. 3. By a stopper (not shown), the actuator 190 is restricted from rotating in the direction indicated by the arrow 198 from the position indicated by the solid line. The actuator 190 includes a float 191, a shaft 192, an arm 193, and the detectable section 194.

The float 191 is formed of material having a lower specific gravity than the ink stored in the liquid chamber 171. The shaft 192 is formed to protrude in the left-right direction(s) 9 from left and right sides of the float 191. The shaft 192 is inserted into holes (not shown) formed in the supporting member. Thereby, the actuator 190 is supported by the supporting member in a rotatable manner about the shaft 192. The arm 193 extends substantially upward from the float 191. The detected section 194 is located at a protruding end of the arm 193. The detected section 194 is a plate-shaped member extending in the vertical direction 7 and the front-rear direction 8. The detected section 194 is formed of material (or with color) that blocks the light emitted by the light emitter of the liquid level sensor 155.

When a liquid surface level of the ink in the liquid chamber 171 is equal to or higher than a particular position P, the actuator 190, rotated in the direction of the arrow 198 by a buoyancy force, is held by the stopper in a detection position indicated by the solid line in FIG. 3. When the liquid surface level of the ink becomes lower than the particular position P, the actuator 190 is rotated in the direction of the arrow 199, following a drop in the liquid surface level. Thereby, the detected section 194 moves to a position out of the detection position. Thus, the detected section 194 moves to a position corresponding to an amount of the ink stored in the liquid chamber 171.

The particular position P is represented by an imaginary line that extends horizontally at the same height as an axial center of the needle 181 and a center of an after-mentioned ink supply port 234. The particular position P is not limited to the aforementioned position as long as the particular position P is higher than the outlet 174 in the vertical direction 7. For instance, the particular position P may be as high as an upper end or a lower end of the internal space of the needle 181, or may be as high as an upper end or a lower end of the ink supply port 234.

When the liquid surface level of the ink stored in the liquid chamber 171 is equal to or higher than the particular position P, the light emitted by the light emitter of the liquid level sensor 155 is blocked by the detected section 194. In this case, since the light from the light emitter does not reach the light receiver, the liquid level sensor 155 outputs a low-level liquid level signal. When the liquid surface level of the ink stored in the liquid chamber 171 is lower than the particular position P, the light emitted by the light emitter reaches the light receiver. In this case, the liquid level sensor 155 outputs a high-level liquid level signal. Based on the liquid level signal, the controller 130 is enabled to detect whether or not the liquid surface level of the ink in the liquid chamber 171 is equal to or higher than the particular position P.

[Cartridge]

Figure 4A:
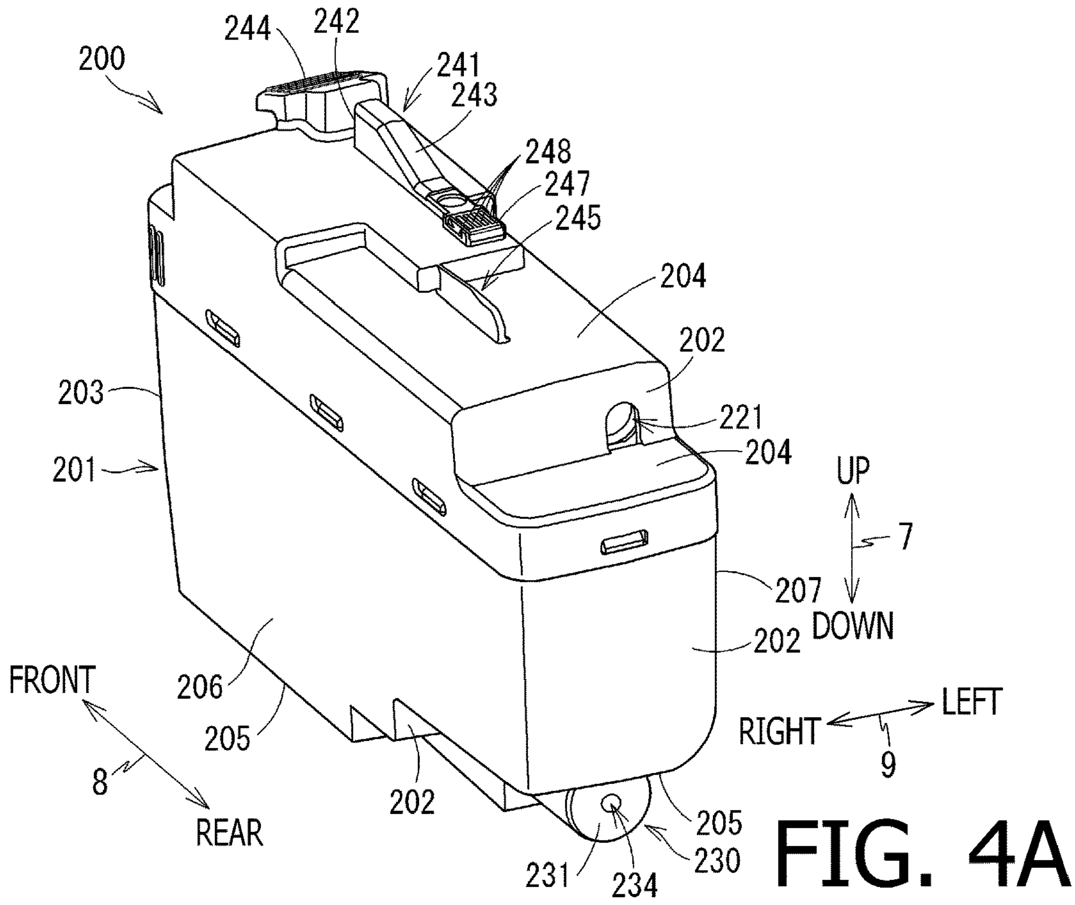
FIG. 4A is a perspective view of a cartridge when viewed from an upper right rear side.

Each cartridge 200 has a liquid chamber 210 (see FIG. 2) configured to store ink therein. For instance, the liquid chamber 210 is defined by walls made of resin. As shown in FIG. 4A, the dimensions of the cartridge 200 in the vertical direction 7 and the front-rear direction 8 are larger than the dimension of the cartridge 200 in the left-right direction 9. The external shapes of the cartridges 200 to store inks of different colors may be the same as or different from each other.

The cartridge 200 has a housing 201 and a supply tube 230. The housing 201 has a rear wall 202, a front wall 203, an upper wall 204, a lower wall 205, and two side walls 206 and 207. The rear wall 202 includes a plurality of walls that are displaced from each other in the front-rear direction 8. The upper wall 204 includes a plurality of walls that are displaced from each other in the vertical direction 7. The upper wall 204 includes a plurality of walls that are displaced from each other in the vertical direction 7.

Figure 4B:
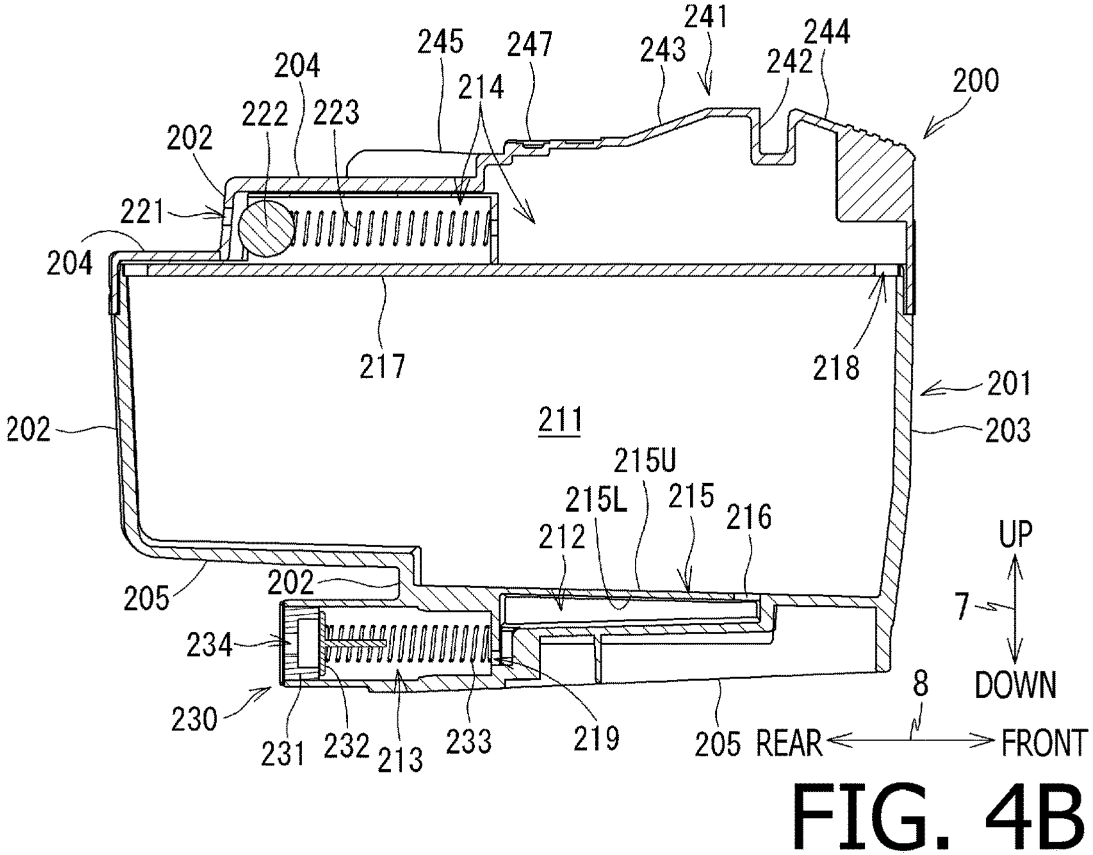
FIG. 4B is a cross-sectional side view showing an internal configuration of the cartridge.

As shown in FIG. 4B, the cartridge 200 contains, in the internal space thereof, the liquid chamber 210, an ink valve chamber 213, and an atmosphere valve chamber 214. The liquid chamber 210 includes an upper liquid chamber 211 and a lower liquid chamber 212. The upper liquid chamber 211, the lower liquid chamber 212, and the atmosphere valve chamber 214 form the internal space of the housing 201. The ink valve chamber 213 forms the internal space of the supply tube 230. The liquid chamber 210 is configured to store ink. The liquid chamber 210 is communicated with the outside of the cartridge 200 through the atmosphere valve chamber 214.

The upper liquid chamber 211 and the lower liquid chamber 212 of the liquid chamber 210 are separated in the vertical direction 7 by a partition wall 215 that divides the internal space of the housing 201. The upper liquid chamber 211 and the lower liquid chamber 212 are communicated with each other via a through hole 216 formed in the partition wall 215. The upper liquid chamber 211 and the atmosphere valve chamber 214 are separated in the vertical direction 7 by a partition wall 217 that divides the internal space of the housing 201. An upper surface 215U of the partition wall 215 defines a lower end of the upper liquid chamber 211. A lower surface 215L of the partition wall 215 defines an upper end of the lower liquid chamber 212. The upper liquid chamber 211 and the atmosphere valve chamber 214 are communicated with each other via a through hole 218 formed in the partition wall 217. The ink valve chamber 213 is communicated with a lower end of the lower liquid chamber 212 via a through hole 219.

The atmosphere valve chamber 214 is communicated with the outside of the cartridge 200 through an atmospheric communication port 221 formed in the rear wall 202, at an upper portion of the cartridge 200. The atmosphere valve chamber 214 is communicated with the atmosphere through the atmosphere communication port 221. In the atmosphere valve chamber 214, a valve 222 and a coil spring 223 are disposed. The valve 222 is movable along the front-rear direction 8 between a closed position to close the atmosphere communication port 221 and an open position to open the atmosphere communication port 221. The coil spring 223 is configured to urge the valve 222 backward, i.e., in such a direction as to move the valve 222 from the open position to the closed position.

In the process of attaching the cartridge 200 to the attachment case 150, the rod 153 enters the atmosphere valve chamber 214 through the atmosphere communication port 221. The rod 153, which has entered the atmosphere valve chamber 214, moves the valve 222 forward against the urging force of the coil spring 223. As the valve 222 moves to the open position, the upper liquid chamber 211 is communicated with the atmosphere.

The supply tube 230 protrudes rearward from the rear wall 20 at a lower portion of the housing 201. The supply tube 230 has an opening at a protruding end (i.e., rear end) thereof. The liquid chamber 210, which is communicated with the ink valve chamber 210 via the through hole 219, is communicated with the outside of the cartridge 200 through the ink valve chamber 213. A packing 231, a valve 232, and a coil spring 233 are disposed in the ink valve chamber 213.

In a center of the packing 231 in the vertical direction 7 and the left-right direction 9, an ink supply port 234 is formed to penetrate the packing 231 in the front-rear direction 8. An inner diameter of the ink supply port 234 is slightly smaller than an outer diameter of the needle 181. The valve 232 is movable along the front-rear direction 8 between a closed position and an open position. When the valve 232 is in the closed position, the valve 232 is in contact with the packing 231, thereby closing the ink supply port 234. When the valve 232 is in the open position, the valve 232 is separated from the packing 231, thereby opening the ink supply port 234. The coil spring 233 is configured to urge the valve 232 rearward, i.e., in such a direction as to move the valve 232 from the open position to the closed position. The urging force of the coil spring 233 is greater than the urging force of the coil spring 186.

In the process of attaching the cartridge 200 to the attachment case 150, the supply tube 230 enters the guide 182, and then the needle 181 enters the ink valve chamber 213 through the ink supply port 234. At this time, the needle 181 comes into close contact with an inner circumferential surface that defines the ink supply port 234, while elastically deforming the packing 231. As the cartridge 200 is further inserted into the attachment case 150, the needle 181 moves the valve 232 forward against the urging force of the coil spring 233. The valve 232 causes the valve 185, which protrudes from the opening 183 of the needle 181, to move backward against the urging force of coil spring 186.

Figure 5:
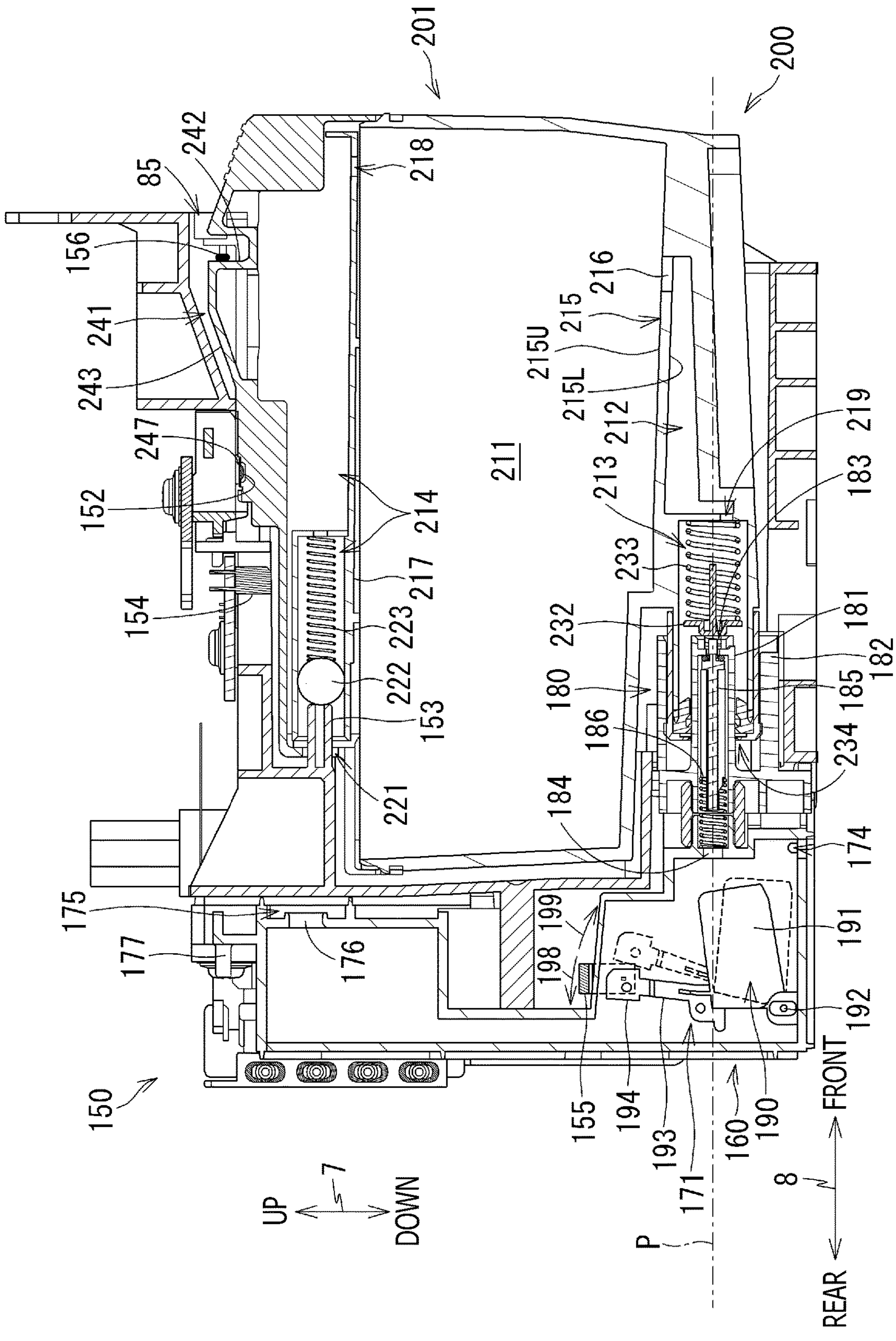
FIG. 5 is a cross-sectional side view showing the cartridge attached to an attachment case.

Thereby, as shown in FIG. 5, the ink supply port 234 and the opening 183 are open, and the ink valve chamber 213 of the supply tube 230 is communicated with the internal space of the needle 181. In other words, when the cartridge 200 is attached to the attachment case 150, the ink valve chamber 213 and the internal space of the needle 181 form a flow path through which the liquid chamber 210 of the cartridge 200 is communicated with the liquid chamber 171 of the sub tank 160.

In the state where the cartridge 200 is attached to the attachment case 150, the fluid chamber 210 and the fluid chamber 171 partially overlap each other when viewed horizontally. Therefore, the ink stored in the liquid chamber 210 moves into the liquid chamber 171 of the sub tank 160 through the supply tube 230 and the joint 180 connected with each other, due to a hydraulic head difference between the liquid chambers 210 and 171. As shown in FIG. 6, the liquid surface level of the ink stored in the liquid chamber 210 of the cartridge 200 attached to the attachment case 150 becomes as high as the liquid surface level of the ink stored in the liquid chamber 171 of the sub tank 160.

As shown in FIGS. 4A and 4B, a protrusion 241 is formed on the upper wall 204. The projection 241 protrudes upward from an outer surface of the upper wall 204 and extends along the front-rear direction 8. The projection 241 has a locking surface 242 and an inclined surface 243. The locking surface 242 and the inclined surface 243 are located above the upper wall 204. The locking surface 242 faces forward in the front-rear direction 8 and extends in the vertical direction 7 and the left-right direction 9. The inclined surface 243 is inclined with respect to the upper wall 204 in such a manner as to face upward and rearward (i.e., face toward an upper rear side).

The locking surface 242 is configured to come into contact with the locking pin 156 when the cartridge 200 is attached to the attachment case 150. The inclined surface 243 is configured to guide the locking pin 156 to a position where the locking pin 156 contacts the locking surface 242 in the process of attaching the cartridge 200 to the attachment case 150. When the locking surface 242 and the locking pin 156 are in contact with each other, the cartridge 200 is held in the attachment position shown in FIG. 5 against the urging forces of the coil springs 186, 223, and 233.

A flat-plate-shaped member is formed to extend upward from the upper wall 204, in front of the locking surface 242. An upper surface of the flat-plate-shaped member is an operable section 244 configured to be operated by the user when the cartridge 200 is removed from the attachment case 150. When the cartridge 200 is attached to the attachment case 150, and the cover 87 is in the exposure position, the operable section 244 is operable by the user. When the operable section 244 is pressed downward, the cartridge 200 is rotated. Thereby, the locking surface 242 moves downward lower than the locking pin 156. As a result, the cartridge 200 is removable from the attachment case 150.

A light-shielding rib 245 is formed rearward of the protrusion 241, on the outer surface of the upper wall 204. The light-shielding rib 245 protrudes upward from the outer surface of the upper wall 204 and extends along the front-rear direction 8. The light-shielding rib 245 is formed of material or with color that blocks the light emitted by the light emitter of the attachment sensor 154. The light-shielding rib 245 is disposed on a light path from the light emitter to the light receiver of the attachment sensor 154 in the state where the cartridge 200 is attached to the attachment case 15. The attachment sensor 154 outputs a low-level attachment signal when the cartridge 200 is attached to the attachment case 150. Further, the attachment sensor 154 outputs a high-level attachment signal when the cartridge 200 is not attached to the attachment case 150. The controller 130 is enabled to detect whether the cartridge 200 is attached to the attachment case 150, based on the attachment signal output from the attachment sensor 154.

An IC substrate 247 is disposed between the light-shielding rib 245 and the protrusion 241 in the front-rear direction 8, on the outer surface of the upper wall 204. The IC substrate 247 has electrodes 248 formed thereon. The IC substrate 247 includes a memory (not shown). Hereinafter, the memory of the IC substrate 247 may be referred to as a "cartridge memory." The electrodes 248 are electrically connected with the cartridge memory. On the upper surface of the IC substrate 247, the electrodes 248 are exposed in a manner electrically conductively connectable with the contact 152. When the cartridge 200 is attached to the attachment case 150, the electrodes 248 are electrically conductively connected with the contact 152. The controller 130 is enabled to read information from the cartridge memory and write information into the cartridge memory, through the contact 152 and the electrodes 248.

The cartridge memories for black, yellow, cyan, and magenta are configured to store ink volumes Vck, Vcy, Vcc, and Vcm, respectively. Further, each cartridge memory is configured to store cartridge attribute information that indicates information such as a cartridge type of a corresponding cartridge. The cartridge type will be described in detail later. When a cartridge 200 is unused, the corresponding cartridge memory stores an initial ink volume as the ink volume. The initial ink volume indicates an amount of the ink stored in the unused cartridge 200.

[Controller]

FIG. 7 is a block diagram schematically showing a configuration of a system 1 including the printer 10 and a charging server 300 interconnected via a communication network 350. As shown in FIG. 7, the controller 130 includes a CPU 131, a ROM 132, a RAM 133, an EEPROM 134, and an ASIC 135. The ROM 132 stores therein programs 132*a* that are configured to, when executed by the CPU 131, cause the CPU 131 to perform various processes. The RAM 133 is usable as a storage area for temporarily storing data and signals used for the CPU 131 to execute the above programs 132*a* and as a work area for data processing. The EEPROM 134 is configured to store information that should be retained even after the printer 10 is powered off.

The ASIC 135 is used to operate the pick-up roller 23, the conveyance rollers 25, the discharge rollers 27, and the head 21. The controller 130 drives a motor (not shown) through the ASIC 135, thereby rotating the pick-up roller 23, the conveyance rollers 25, and the discharge rollers 27. The controller 130 sends a drive signal to each drive element of the head 21 through the ASIC 135, thereby causing the head 21 to eject ink from the nozzles 29. The ASIC 135 is configured to output a plurality of types of drive signals according to an amount of ink to be ejected from each nozzle 29.

The ASIC 135 is connected with a display 17 and an operation panel 22. For instance, the display 17 includes a liquid crystal display device or an organic EL display device. The display 17 may be an example of a "notification device" according to aspects of the present disclosure. The notification device is not limited to the display 17, but may be a speaker, an LED lamp, or a combination of at least two of the above devices (i.e., the display 17, the speaker, and the LED lamp). The operation panel 22 is configured to output, to the controller 130, an operation signal according to a user operation to the operation panel 22. For instance, the operation panel 22 may include operable buttons, and/or a touch sensor overlaid on the display 17.

The ASIC 135 is connected with the contact 152, the attachment sensor 154, and the liquid level sensor 155, of each attachment case 150. The controller 130 is configured to access, via the contact 152, the cartridge memory of each cartridge 200 attached to the corresponding attachment case 150. The controller 130 is further configured to detect, via the attachment sensor 154, whether each cartridge 200 is attached to or removed from the corresponding attachment case 150. The controller 130 is further configured to detect, via the liquid level sensor 155, whether or not the surface level of the ink in the liquid chamber 171 is equal to or higher the particular position P.

The ASIC 135 is connected with a communication I/F ("I/F" is an abbreviation for "interface") 140. The communication I/F 140 is an interface for communication with the charging server 300. The printer 10 is enabled to control the communication I/F 140, thereby communicating with the charging server 300 via the communication network 350.

[Contract for Printer]

The user of the printer 10 may sign a contract with a vendor of the printer 10 and use the printer 10 in accordance with the signed contract. In the illustrative embodiment, an example case will be considered in which the vendor of the printer 10 provides such a service that the user is allowed to use ink free of charge until the number of printed sheets reaches a contracted number of printable sheets, instead of paying a price for the used ink.

Until the user signs a contract for the service, the user purchases commercial cartridges and performs printing with ink stored in the commercial cartridges. The vendor sends the cartridges 200 with ink stored to the user who has made the contract for the service. For instance, the vendor sends a new cartridge 200 when a remaining amount of ink in the currently-attached cartridge 200 of the printer 10 runs low. After the user has made the contract for the service, the user performs printing with the ink stored in the cartridge 200 (hereinafter, which may be referred to as the "contract cartridge") sent by the vendor. Each attachment case 150 is configured to support a corresponding contract cartridge or a corresponding commercial cartridge attached thereto.

The controller 130 of the printer 10 operates in a contract mode when the contract for the service has been made. Meanwhile, the controller 130 operates in a non-contract mode when the contract for the service has not been made. The controller 130 is configured to make a transition of its operational mode between the contract mode and the non-contract mode. The contract mode represents an operational state where the contract for the service using the contract cartridges has been made. The non-contract mode represents an operational state where the contract for the service using the contract cartridges has not been made.

[Data and Information Used by Controller]

The ROM 132 stores ink volumes Vak, Vay, Vac, and Vam. The ink volume Vak is a total amount of black ink when the liquid level signal for black changes from the low level to the high level. The ink volumes Vay, Vac, and Vam are defined in substantially the same manner as the ink volume Vak except for the difference in color. The ink volumes Vak, Vay, Vac, and Vam are fixed values determined according to structures of the printer 10 and the cartridges 200. If the structure of the printer 10 is the same and the structures of the cartridges 200 are the same with respect to the four ink colors, the ink volumes Vak, Vay, Vac, and Vam will be the same value. In this case, the ROM 132 may store only one ink volume.

In the illustrative embodiment, when the liquid level signal for each color changes from the low level to the high level, that is, when the liquid surface level of the ink in the liquid chamber 171 for each color becomes lower than the particular position P, the amount of the ink stored in the cartridge 200 for each color is 0. Further, in this case, the amounts of the ink stored in the sub tanks 160 for respective colors are equal to the ink volumes Vak, Vay, Vac, and Vam. Therefore, when the liquid level signal for each color changes from the low level to the high level, the ROM 132 stores, as the ink volume Vak, the amount of the ink stored in the sub tank 160 for each color.

In order for the controller 130 to perform an after-mentioned ink volume calculation process, the EEPROM 134 stores the ink volumes Vck, Vcy, Vcc, and Vcm, ink volumes Vsk, Vsy, Vsc, and Vsm, thresholds Vhk, Vhy, Vhc, and Vhm, functions F1*k*, F1*y*, F1*c*, and F1*m*, functions F2*k*, F2*y*, F2*c*, and F2*m*, count values SNk, SNy, SNc, and SNm, and count values TNk, TNy, TNc, and TNm.

If, with respect to the four colors, the structure of the printer 10 is the same and the structures of the cartridges 200 are the same, the thresholds Vhk, Vhy, Vhc, and Vhm will be the same value. In this case, the EEPROM 134 may store only one threshold. The same applies to the functions F1*k*, F1*y*, F1*c*, and F1*m*, the functions F2*k*, F2*y*, F2*c*, and F2*m*, the count values SNk, SNy, SNc, and SNm, and the count values TNk, TNy, TNc, and TNm. It is noted that the thresholds Vhk, Vhy, Vhc, and Vhm, the functions F1*k*, F1*y*, F1*c*, and F1*m*, and the functions F2*k*, F2*y*, F2*c*, and F2*m* may be stored in the ROM 132 instead of the EEPROM 134.

The ink volume Vck is an amount of the ink stored in the liquid chamber 210 of the black cartridge 200. The ink volume Vsk is an amount of the ink stored in the liquid chamber 171 of the black sub tank 160. The functions F1*k* and F2*k* are information representing a correspondence relationship between a total ink volume Vtk and the ink volume Vsk of the black ink in the printer 10.

The ink stored in the liquid chamber 210 of the black cartridge 200 and the ink stored in the liquid chamber 171 of the black sub tank 160 are in equilibrium when their respective liquid surface levels in the vertical direction 7 are equal to each other. In the equilibrium state, the movement of the black ink between the liquid chamber 210 and the liquid chamber 171 stops. The relationship between the total ink volume Vtk and the ink volume Vsk of the black ink in the equilibrium state may be approximately represented by one or more functions determined based on actual measurement values thereof.

As shown in FIG. 8, the relationship of the ink volume Vsk to the total ink volume Vtk of the black ink may be approximately represented by two functions F1*k* and F2*k*. The function F1*k* represents a relationship of the ink volume Vsk with the total ink volume Vtk of the black ink when the total ink volume Vtk is equal to or more than the threshold Vhk. For instance, the function F1*k* is expressed as Vsk=a×Vtk+b (where a and b are constants). The function F2*k* represents a relationship of the ink volume Vsk with the total ink volume Vtk of the black ink when the total ink volume Vtk is less than the threshold Vhk. For instance, the function F2*k* is expressed as Vsk=c×Vtk+d (where c and d are constants).

The threshold Vhk corresponds to the total ink volume Vtk when the liquid surface of the ink stored in the upper liquid chamber 211 of the liquid chamber 210 of the black cartridge 200 comes into contact with the upper surface 215U or the lower surface 215L of the partition wall 215. The ink volume Vsk is determined by the function F1*k* when the liquid surface of the ink stored in the liquid chamber 210 of the black cartridge 200 is in contact with or higher than the partition wall 215 in the liquid chamber 210 of the black cartridge 200 (i.e., when the total ink volume Vtk is equal to or more than the threshold Vhk). Meanwhile, the ink volume Vsk is determined by the function F2*k* when the liquid surface of the ink stored in the liquid chamber 210 of the black cartridge 200 is lower than the partition wall 215 in the liquid chamber 210 of the black cartridge 200 (i.e., when the total ink volume Vtk is less than the threshold Vhk). The ink volume Vck is calculated by subtracting the ink volume Vsk from the total ink volume Vtk.

The count value SNk corresponds to an ejection amount of black ink which the head 21 is instructed to eject after the liquid level signal for black changes from the low level to the high level. The count value SNk is a value to be counted up. The count value TNk corresponds to an ejection amount of black ink which the head 21 is instructed to eject after the attachment signal for black changes from the high level to the low level. The count value TNk is a value to be counted up. Initial values of the count values SNk and TNk are 0. It is noted that the count values SNk and TNk may be values to be counted down from their respective initial values.

The ink volumes Vcy, Vcc, and Vcm are defined in substantially the same manner as the ink volume Vck except for the difference in color. The ink volumes Vsy, Vsc, and Vsm are defined in substantially the same manner as the ink volume Vsk except for the difference in color. The thresholds Vhy, Vhc, and Vhm are defined in substantially the same manner as the threshold Vhk except for the difference in color. The functions F1*y*, F1*c*, and F1*m* are defined in substantially the same manner as the function F1*k* except for the difference in color. The functions F2*y*, F2*c*, and F2*m* are defined in substantially the same manner as the function F2*k* except for the difference in color. The count values SNy, SNc, and SNm are defined in substantially the same manner as the count value SNk except for the difference in color. The count values TNy, TNc, and TNm are defined in substantially the same manner as the count value TNk except for the difference in color. The count values TNy, TNc, and TNm are defined in substantially the same manner as the count value TNk except for the difference in color.

In order for the controller 130 to perform an after-mentioned sub tank remaining volume calculation process, the EEPROM 134 stores operational mode information, contract information, four pieces of cartridge attribute information, and ink volumes Vck', Vcy' Vcc', and Vcm', ink volumes Vsk', Vsy', Vsc', and Vsm', ink volumes SKk, SKy, SKc, and SKm, and ink volumes SSk, SSy, SSc, and SSm.

The operational mode information indicates whether the controller 130 operates in the contract mode or the non-contract mode. The contract information is information regarding the contract made between the user of the printer 10 and the vendor of the printer 10. The contract information is valid only when the operational mode information indicates the contract mode. The contract information includes, for instance, a contract number. The operational mode information and the contract information are written into the EEPROM 134 in response to the operation panel 22 being operated by the user of the printer 10 or an operator of the vendor of the printer 10.

The ink volume Vck' is the ink volume Vck at the last time when the sub tank remaining volume calculation process was performed. The ink volume Vsk' is the ink volume Vsk at the last time when the sub tank remaining volume calculation process was performed. The ink amount SKk is an amount of ink supplied from the black contract cartridge and stored in the black sub tank 160. The ink volume SSk is an amount of ink supplied from the black commercial cartridge and stored in the black sub tank 160. The ink volumes Vcy', Vcc', and Vcm' are defined in substantially the same manner as the ink volume Vck' except for the difference in color. The ink volumes Vsy', Vsc', and Vsm' are defined in substantially the same manner as ink volume Vsk' except for the difference in color. The ink volumes SKy, SKc, and SKm are defined in substantially the same manner as the ink volume SKk except for the difference in color. The ink volumes SSy, SSc, and SSm are defined in substantially the same manner as the ink volume SSk except for the difference in color.

The controller 130 stores, in the EEPROM 134, the ink volumes SKk, SKy, SKc, and SKm that are the amounts of ink supplied from the contract cartridges for the respective colors and stored in the sub tanks 160 for the respective colors when the contract cartridges for the respective colors are attached to the attachment cases 150 for the respective colors. Further, the controller 130 stores, in the EEPROM 134, the ink volumes SSk, SSy, SSc, and SSm that are the amounts of ink supplied from the commercial cartridges for the respective colors and stored in the sub tanks 160 for the respective colors when the commercial cartridges for the respective colors are attached to the attachment cases 150 for the respective colors.

In addition to the above data and information, the controller 130 stores various types of data. The various types of data include four pieces of first liquid level information, four pieces of second liquid level information, four flags FLAGk, FLAGy, FLAGy, FLAGc, and FLAGm, and a charging flag, ink volumes Vtk, Vty, Vtc, and Vtm, ink change amounts Pk, Py, Pc, and Pm, ink consumption amounts Qk, Qy, Qc, and Qm, and ink change amounts Rk, Ry Rc, and Rm. These data are stored in the RAM 132.

[Operations by Controller]

Operations by the controller 130 will be described with reference to FIGS. 9A to 13. Processes shown in FIGS. 9A to 13 are repeatedly performed by the CPU 131 of the controller 130 while the printer 10 is powered on. The processes shown in FIGS. 9A to 13 may be performed by the CPU 131 reading out and executing the programs 132*a* stored in the ROM 132 or may be achieved by one or more hardware circuits on the controller 130. An execution order of the processes may be changed as appropriate within the scope of the inventive concept as expressed herein. In the following description, unless otherwise specified, data and information used by the controller 130 are stored in the RAM 133 or the EEPROM 134.

As shown in FIGS. 9A and 9B, the controller 130 determines whether at least one of the four attachment signals output from the four attachment sensors 154 has changed from the high level to the low level (S11). In response to determining that at least one of the four attachment signals output from the four attachment sensors 154 has changed from the high level to the low level (S11: Yes), the controller 130 proceeds to S12. In this case, the controller 130 performs an "ink volume calculation process at time of cartridges attached" (see FIG. 10) (S12). Next, the controller 130 determines whether the operational mode information indicates the contract mode (S13). In response to determining that the operational mode information indicates the contract mode (S13: Yes), the controller 130 proceeds to S14. In this case, the controller 130 performs a "sub tank remaining volume calculation process at time of cartridges attached" (see FIG. 12) (S14). Thereafter, the controller 130 proceeds to S15.

In response to determining that the operational mode information does not indicate the contract mode (S13: No), the controller 130 proceeds to S15 without executing S14. In response to determining that none of the four attachment signals output from the four attachment sensors 154 has changed from the high level to the low level (S11: No), the controller 130 proceeds to S15 without executing any step of S12 to S14.

In S15, the controller 130 determines whether the controller 130 has received an instruction to operate the printer 10. For instance, such an instruction is input into the controller 130 from a device (not shown, e.g., a personal computer) connected with the printer 10 via a cable or a LAN. In another instance, such an instruction may be input into the controller 130 through a user operation to the operation panel 22. In response to determining that the controller 130 has received an instruction to operate the printer 10 (S15: Yes), the controller 130 proceeds to S16. Meanwhile, in response to determining that the controller 130 has not received an instruction to operate the printer 10 (S15: No), the controller 130 goes back to S11.

In S16, the controller 130 determines whether the instruction received is an ink consumption instruction. The ink consumption instruction represents an instruction that causes the head 21 to eject ink from the nozzles 29 thereby reducing reduce the amount of the ink stored in the cartridges 200 and the sub tanks 160. Examples of the ink consumption instruction may include, but are not limited to, a print instruction and a purge instruction. In response to determining that the instruction received is an ink consumption instruction (S16: Yes), the controller 130 proceeds to S18. In response to determining that the instruction received is not an ink consumption instruction (i.e., an instruction not causing ink consumption) (S16: No), the controller 130 proceeds to S17. In this case, the controller 130 performs an operation that does not consume ink (S17), and thereafter goes back to S11.

In S18, the controller 130 performs an "ink consumption operation" and an "ink volume calculation process at time of ink consumption" (see FIG. 11). Next, the controller 130 determines whether the operational mode information indicates the contract mode (S19). In response to determining that the operational mode information indicates the contract mode (S19: Yes), the controller 130 proceeds to S20. In response to determining that the operational mode information does not indicate the contract mode (i.e., the operational mode information indicates the non-contract mode) (S19: No), the controller 130 proceeds to S24 without executing any step of S20 to S23.

In S20, the controller 130 performs the sub tank remaining volume calculation process at time of ink consumption (see FIG. 13). As will be described below, the controller 130 sets the charging flag to "ON" or "OFF" in the sub tank remaining volume calculation process at time of ink consumption. Next, the controller 130 determines whether the charging flag set in the sub tank remaining volume calculation process at time of ink consumption is "ON" (S21). In response to determining that the charging flag is "ON" (S21: Yes), the controller 130 proceeds to S22. In response to determining that the charging flag is not "ON" (i.e. the charging flag is "OFF") (S21: No), the controller 130 proceeds to S24 without executing any step of S22 and S23.

In S22, the controller 130 sends a charging instruction to the charging server 300. The charging instruction sent to the charging server 300 contains a contract number included in the contract information, and information indicating that printing for one sheet has been performed. Next, the controller 130 causes the display 17 to show that a charging process is performed (S23). For instance, when the controller 130 executes S23, a message "Perform Charging Process" is displayed on the display 17.

In S24, the controller 130 determines whether there is a continued instruction. For instance, the controller 130 determines whether there are still pages to be printed. In response to determining that there is a continued instruction (S24: Yes), the controller 130 proceeds to S18. Meanwhile, in response to determining that there is no continued instruction (S24: No), the controller 130 proceeds to S11.

Thus, in the non-contract mode, in response to at least one cartridge 200 being attached (S11: Yes), the controller 130 performs the ink volume calculation process at time of cartridges attached (S12). Further, in the non-contract mode, in response to an ink consumption instruction being input (S15: Yes, and S16: Yes), the controller 130 performs an ink consumption operation and the ink volume calculation process at time of ink consumption (S18). In the contract mode, in response to at least one cartridge 200 being attached (S11: Yes), the controller 130 performs the ink volume calculation process at time of cartridges attached (S12), and additionally performs the sub tank remaining volume calculation process at time of cartridges attached (S14). Further, in the contract mode, in response to an ink consumption instruction being input (S15: Yes, and S16: Yes), the controller 130 performs an ink consumption operation and the ink volume calculation process at time of ink consumption (S18), and additionally performs the sub tank remaining volume calculation process at time of ink consumption (S20).

[Ink Volume Calculation Process at Time of Cartridges Attached]

Referring to FIG. 10, a detailed explanation will be provided of the "ink volume calculation process at time of cartridges attached" (see S12 in FIG. 9A). The controller 130 first selects an unprocessed color from among the four colors (i.e., black, yellow, cyan, and magenta) and sets the selected color as "i" (S31). It is noted that the unprocessed color represents a color that has not yet been selected as a target color for processing in the following steps. Namely, "i" is one of k (black), y (yellow), c (cyan), and m (magenta).

Next, the controller 130 determines whether the attachment signal for the color i has changed from the high level to the low level (S32). The attachment signal for the color i changes from the high level to the low level when the cartridge 200 for the color i is attached to the corresponding attachment case 150. In response to determining that the attachment signal for the color i has changed from the high level to the low level (S32: Yes), the controller 130 proceeds to S33. In response to determining that the attachment signal for the color i has not changed from the high level to the low level (S32: No), the controller 130 proceeds to S37 without executing any step of S33 to S36.

In S33, the controller 130 reads out an ink volume Vci and the cartridge attribute information from the cartridge memory for the color i through the contact 152, and writes the read cartridge attribute information into the EEPROM 134. Thereby, the cartridge attribute information is updated with the cartridge attribute information stored in the cartridge memory for the color i.

Next, the controller 130 calculates a total ink volume Vti for the color i after the cartridge 200 of the color i has been attached (S34). More specifically, the controller 130 calculates the total ink volume Vti for the color i by adding the ink volume Vci read out from the cartridge memory for the color i in S33 to the ink volume Vsi stored in the EEPROM 134. Namely, the controller 130 calculates the total ink volume Vti for the color i according to the following formula (1).

$$Vti=Vci+Vsi \quad (1)$$

Next, the controller 130 obtains the ink volumes Vci and Vsi based on the total ink volume Vti for the color i as calculated in S34, and the function F1*i* or the function F2*i* (S35). More specifically, the controller 130 determines whether the total ink volume Vti for the color i is equal to or more than the threshold Vhi. When determining that the total ink volume Vti is equal to or more than the threshold Vhi, the controller 130 obtains the ink volume Vsi from the total ink volume Vti using the function F1*i*. When determining that the total ink volume Vti is less than the threshold Vhi, the controller 130 obtains the ink volume Vsi from the total ink volume Vti using the function F2*i*. The controller 130 calculates the ink volume Vci by subtracting the ink volume Vsi from the total ink volume Vti.

Next, the controller 130 writes the ink volume Vci obtained in S35 into the cartridge memory for the color i (S36). Thereby, the ink volume Vci stored in the cartridge memory for the color i is updated to the ink volume Vci calculated in S35.

Next, the controller 130 determines whether there is an unprocessed color among the four colors (S37). In response to determining that there is an unprocessed color (S37: Yes), the controller 130 proceeds to S31. In response to determining that there are no unprocessed colors (i.e., the processing has been completed for all the four colors) (S37: No), the controller 130 terminates the ink volume calculation process, and then returns to just after the completion of S12 (see FIG. 9A).

[Ink Consumption Operation and Ink Volume Calculation Process at Time of Ink Consumption]

Referring to FIG. 11, a detailed explanation will be provided of the "ink consumption operation" and the "ink volume calculation process at time of ink consumption" (see S18 in FIG. 9B). The controller 130 first obtains four liquid level signals output from the four liquid level sensors 155 (S41). The liquid level signals obtained in S41 are liquid level signals before the ink consumption operation. The controller 130 writes into the RAM 133 information indicating whether the four liquid level signals are high-level signals or low-level signals as first liquid level information.

Next, the controller 130 performs the ink consumption operation (S42). For instance, in S42, the controller 130 performs an operation to print an image on one sheet. More specifically, the controller 130 causes the pick-up roller 23 and the conveyance rollers 25 to convey a sheet placed on the feed tray 15, causes the head 21 to eject ink, and causes the discharge rollers to discharge the sheet with an image recorded thereon onto the discharge tray 16. In S42, the controller 130 may perform an ink consumption operation (e.g., a purge operation) other than printing.

Next, the controller 130 obtains four liquid level signals output from the four liquid level sensors 155 again (S43). The liquid level signals obtained in S43 are liquid level signals after the ink consumption operation. The controller 130 writes into the RAM 133 information indicating whether the four liquid level signals are high-level signals or low-level signals as second liquid level information.

Next, the controller 130 selects an unprocessed color from among the four colors and sets the selected color as "i" (S44). Next, the controller 130 makes a determination about the liquid level signal for the color i based on the first liquid level information and the second liquid level information (S45). In response to determining that both the liquid level signals for the color i as obtained in S41 and S43 are low-level signals (S45: Remain Low), the controller 130 proceeds to S46. In response to determining that the liquid level signal for the color i as obtained in S41 is a low-level signal and that the liquid level signal for the color i as obtained in S43 is a high-level signal (S45: Changed from Low to High), the controller 130 proceeds to S50. In response to determining that both the liquid level signals for the color i as obtained in S41 and S43 are high-level signals (S45: Remain High), the controller 130 proceeds to S52.

The controller 130 reaches S46 when the liquid surface level of the ink in the liquid chamber 210 of the cartridge 200 for the color i is equal to or higher than the particular position P, irrespective of whether it is before or after the ink consumption operation (see S42). In S46, the controller 130 updates the count value TNi. More specifically, the controller 130 adds, to the count value TNi, a value corresponding to an amount of ink of the color i that the controller 130 instructed the head 21 to eject in S42.

Next, the controller 130 calculates the total ink volume Vti for the color i after the execution of the ink consumption operation (S47). More specifically, the controller 130 calculates the total ink volume Vti for the color i by subtracting the ink volume corresponding to the count value TNi from the sum of the ink volume Vci and the ink volume Vsi. Namely, the controller 130 calculates the total ink volume Vti for the color i with the following formula (2).

$$Vti=Vci+Vsi-TNi \quad (2)$$

Next, the controller 130 obtains the ink volumes Vci and Vsi based on the total ink volume Vti for the color i as calculated in S47 and the function F1*i* or the function F2*i* (S48). Subsequently, the controller 130 writes into the cartridge memory for the color i the ink volume Vci obtained in S48 (S49). Thereafter, the controller 130 proceeds to S54. In S48, the controller 130 performs the same process as in S35. In S49, the controller 130 performs the same process as in S36.

The controller 130 reaches S50 when the liquid surface level of the ink in the liquid chamber 171 of the sub tank 160 for the color i has become lower than the particular position P during the execution of the ink consumption operation in S42. In S50, the controller 130 sets the ink volume Vci to 0, and updates the ink volume Vsi with the ink volume Vai read out from the ROM 132. Next, the controller 130 writes the ink volume Vci into the cartridge memory for the color i (S51). Thereby, the ink volume Vci stored in the cartridge memory for the color i is updated to 0. After completion of S51, the controller 130 proceeds to S52.

Before and after the ink consumption operation in S42, when the liquid surface level of the ink in the liquid chamber 210 of the cartridge 200 for the color i is lower than the particular position P, the controller 130 reaches S52 without executing any step of S50 and S51. In S52, the controller 130 updates the count value SNi. More specifically, the controller 130 adds, to the count value SNi, the value corresponding to the amount of ink of the color i that the controller 130 instructed the head 21 to eject in S42.

Next, the controller 130 calculates the ink volume Vsi (S53). More specifically, the controller 130 calculates the ink volume Vsi by subtracting the ink volume corresponding to the count value SNi from the ink volume Vai read out from the ROM 132. Namely, the controller 130 updates the ink volume Vsi according to the following formula (3).

$$Vsi=Vai-SNi \quad (3)$$

It is noted that during a period of time from when the controller 130 executes S50 until the controller 130 next executes S48, the ink volume Vci is 0, and the total ink volume Vti for the color i is equal to the ink volume Vsi. After the completion of S53, the controller 130 proceeds to S54.

In S54, the controller 130 determines whether there is an unprocessed color among the four colors. In response to determining that there is an unprocessed color among the four colors (S54: Yes), the controller 130 proceeds to S44. In response to determining that there are no unprocessed colors (i.e., the processing has been completed for all the four colors) (S54: No), the controller 130 terminates the ink consumption operation and the ink volume calculation process at time of ink consumption. Afterward, the controller 130 returns to just after the completion of S18 (see FIG. 9B).

[Sub Tank Remaining Volume Calculation Process at Time of Cartridges Attached]

Referring to FIG. 12, a detailed explanation will be provided of the "sub tank remaining volume calculation process at time of cartridges attached" (see S14 in FIG. 9A). The controller 130 first selects an unprocessed color from among the four colors and sets the selected color as "i" (S111).

Next, the controller 130 calculates an ink change amount Pi of the sub tank 160 for the color i. More specifically, the controller 130 obtains the ink change amount Pi by subtracting the ink volume Vsi' (i.e., the ink volume Vsi at the last time when the sub tank remaining volume calculation process was performed) from the ink volume Vsi (S112). Namely, the controller 130 obtains the ink change amount Pi according to the following formula (4).

$$Pi=Vsi-Vsi' \quad (4)$$

Moreover, in S112, the controller 130 updates the ink volume Vsi' with the ink volume Vsi.

Next, the controller 130 determines the type of the cartridge 200 for the color i (S113). More specifically, the controller 130 identifies the type of the cartridge 200 for the color i based on the attribute information of the cartridge 200 for the color i. In response to determining that the cartridge 200 for the color i is a contract cartridge (S113: Contract Cartridge), the controller 130 proceeds to S114. Meanwhile, in response to determining that the cartridge 200 for the color i is a commercial cartridge (S113: Commercial Cartridge), the controller 130 proceeds to S117.

In S114, the controller 130 determines whether or not the sum (SKi+Pi) of the ink volume SKi and the ink change amount Pi is equal to or more than 0. More specifically, the controller 130 calculates the sum of the ink volume SKi and the ink change amount Pi and determines whether or not the calculated sum is equal to or more than 0. In response to determining that the sum (SKi+Pi) of the ink volume SKi and the ink change amount Pi is equal to or more than 0 (S114: Yes), the controller 130 proceeds to S115. Meanwhile, in response to determining that the sum (SKi+Pi) of the ink volume SKi and the ink change amount Pi is not equal to or more than 0, i.e., the sum (SKi+Pi) of the ink volume SKi and the ink change amount Pi is less than 0 (S114: No), the controller 130 proceeds to S116.

In S115, the controller 130 adds, to the ink volume SKi, the ink change amount Pi obtained in S112, thereby updating the ink volume SKi. Namely, the controller 130 updates the ink volume SKi according to the following formula (5).

$$SKi=SKi+Pi \quad (5)$$

In S116, the controller 130 adds, to the ink volume SSi, the ink volume SKi and the ink change amount Pi, and then sets the ink volume SKi to 0. More specifically, the controller 130 adds, to the ink volume SSi, the ink volume SKi, and the ink change amount Pi obtained in S112, thereby updating the ink volume SKi. Namely, the controller 130 updates the ink volume SSi according to the following formula (6).

$$SSi=SSi+SKi+Pi \quad (6)$$

In S117, the controller 130 determines whether or not the sum (SSi+Pi) of the ink volume SSi and the ink change amount Pi is equal to or more than 0. More specifically, the controller 130 calculates the sum of the ink change amount Pi obtained in S112 and the ink volume SSi, and determines whether or not the calculated sum is equal to or more than 0. In response to determining that the sum (SSi+Pi) of the ink volume SSi and the ink change amount Pi is equal to or more than 0 (S117: Yes), the controller 130 proceeds to S118. Meanwhile, in response to determining that the sum (SSi+Pi) of the ink volume SSi and the ink change amount Pi is not equal to or more than 0, i.e., the sum (SSi+Pi) of the ink volume SSi and the ink change amount Pi is less than 0 (S117: No), the controller 130 proceeds to S119.

In S118, the controller 130 adds, to the ink volume SSi, the ink change amount Pi obtained in S112, thereby updating the ink volume SSi. Namely, the controller 130 updates the ink volume SSi according to the following formula (7).

$$SSi=SSi+Pi \quad (7)$$

In S119, the controller 130 adds, to the ink volume SKi, the ink amount SSi and the ink change amount Pi, and then sets the ink volume SSi to 0. More specifically, the controller 130 adds, to the ink volume SKi, the ink volume SSi, and the ink change amount Pi obtained in S112, thereby updating the ink volume SKi. Namely, the controller 130 updates the ink volume SKi according to the following formula (8).

$$SKi=SKi+SSi+Pi \quad (8)$$

The controller 130 reaches S120 after executing any one of the steps S115, S116, S118, and S119. Next, the controller 130 determines whether there is an unprocessed color among the four colors (S120). In response to determining that there is an unprocessed color (S120: Yes), the controller 130 proceeds to S111. Meanwhile, in response to determining that there are no unprocessed colors (i.e., the processing has been completed for all the four colors) (S120: No), the controller 130 terminates the sub tank remaining volume calculation process at time of cartridges attached, and returns to just after the completion of S14 (see FIG. 9A).

In many cases, an unused cartridge 200 is attached to the corresponding attachment case 150. At this time, the amount of the ink stored in the liquid chamber 171 of the sub tank 160 increases. Therefore, in many cases, the ink change amount Pi obtained in S112 is equal to or more than 0. Thus, in many cases, the controller 130 needs to add the ink change amount Pi to the ink volume SKi or SSi according to the type of the cartridge 200 (S115, S118) in the sub tank remaining volume calculation process at time of cartridges attached.

However, a cartridge 200 that is not an unused one may be attached to the attachment case 150 when the liquid surface level of the ink stored in the liquid chamber 171 of the sub tank 160 is equal to or higher than the particular position P. In this case, ink may flow backward from the sub tank 160 to the cartridge 200, thereby causing the ink volume SKi obtained in S115 or the ink volume SSi obtained in S118 to be negative. In reality, none of the ink volumes SKi and SSi should be negative. Therefore, in the sub tank remaining volume calculation process at time of cartridges attached, when a contract cartridge is attached, and the ink volume SKi obtained in S115 is negative, the controller 130 sets the ink volume SKi to 0, and updates the ink volume SSi according to the formula (6) (S116). Further, when a commercial cartridge is attached, and the ink volume SSi obtained in S118 is negative, the controller 130 sets the ink volume SSi to 0, and updates the ink volume SKi according to the formula (8) (S118).

Thus, in response to determining that the operational mode of the controller 130 is the contract mode and that a contract cartridge is attached to the attachment case 150, the controller 130 obtains the ink volume Vsi in S35 based on the ink volume Vci read out from the cartridge memory of the cartridge 200 in S33, calculates the ink change amount Pi in S112, and updates the ink volume SKi in S115 or S116. In other words, in response to determining that the operational mode of the controller 130 is the contract mode and that a contract cartridge is attached to the attachment case 150, the controller 130 updates the ink volume SKi based on the ink volume Vci obtained from the contract cartridge.

Further, in response to determining that the operational mode of the controller 130 is the contract mode and that a commercial cartridge is attached to the attachment case 150, the controller 130 obtains the ink volume Vsi in S35 based on the ink volume Vci read out from the cartridge memory of the cartridge 200 in S33, calculates the ink change amount Pi in S112, and updates the ink volume SKi in S117 or S118. In other words, in response to determining that the operational mode of the controller 130 is the contract mode and that a commercial cartridge is attached to the attachment case 150, the controller 130 updates the ink volume SSi based on the ink volume Vci obtained from the commercial cartridge. Accordingly, in response to a cartridge 200 being attached, it is possible to update the ink volumes SKk, SKy, SKc, and SKm and the ink volumes SSk, SSy, SSc, and SSm.

[Sub Tank Remaining Volume Calculation Process at Time of Ink Consumption]

Referring to FIG. 13, a detailed explanation will be provided of the "sub tank remaining volume calculation process at time of ink consumption" (see S20 in FIG. 9B). The controller 130 first selects an unprocessed color from among the four colors and sets the selected color as "i" (S131).

Next, the controller 130 calculates an ink consumption amount Qi for the color i and an ink change amount Ri of the cartridge 200 for the color i (S132). More specifically, the controller 130 calculates the ink consumption amount Qi by subtracting the sum (Vci+Vsi) of the ink volume Vci and the ink volume Vsi from the sum (Vci'+Vsi') of the ink volume Vci' and the ink volume Vsi'. The controller 130 obtains the ink change amount Ri by subtracting the ink volume Vci from the ink volume Vci'. Namely, the controller 130 calculates the ink consumption amount Qi according to the following formula (9) and calculates the ink change amount Ri according to the following formula (10).

$$Qi=(Vci'+Vsi')-(Vci+Vsi) \quad (9)$$

$$Ri=Vci'-Vci \quad (10)$$

Further, in S132, the controller 130 updates the ink volumes Vci' and Vsi' with the ink volumes Vci and Vsi, respectively.

Next, the controller 130 determines the type of the cartridge 200 for the color i (S133). In S133, the controller 130 performs the same process as in S113 (see FIG. 12). In response to determining that the cartridge 200 for the color i is a contract cartridge (S133: Contract Cartridge), the controller 130 proceeds to S134. Meanwhile, in response to determining that the cartridge 200 for the color i is a commercial cartridge (S133: Commercial Cartridge), the controller 130 proceeds to S135.

In S134, the controller 130 adds the ink change amount Ri obtained in S132 to the ink volume SKi. Namely, the controller 130 updates the ink volume SKi according to the following formula (11).

$$SKi=SKi+Ri \quad (11)$$

In S135, the controller 130 adds the ink change amount Ri obtained in S132 to the ink volume SSi. Namely, the controller 130 updates the ink volume SSi according to the following formula (12).

$$SSi=SSi+Ri \quad (12)$$

The controller 130 reaches S136 after executing S134 or S135. Subsequently, the controller 130 determines whether or not the ink volume SSi is equal to or more than the ink consumption amount Qi (S136). In response to determining that the ink volume SSi is equal to or more than the ink consumption amount Qi (S136: Yes), the controller 130 proceeds to S137. Meanwhile, in response to determining that the ink volume SSi is not equal to or more than the ink consumption amount Qi, i.e., the ink volume SSi is less than the ink consumption amount Qi (S136: No), the controller 130 proceeds to S138.

In S137, the controller 130 subtracts the ink consumption amount Qi obtained in S132 from the ink volume SSi, and sets the flag FLAGi for the color i to "OFF." Namely, the controller 130 updates the ink volume SSi according to the following formula (13).

$$SSi=SSi-Qi \quad (13)$$

In S138, the controller 130 subtracts the difference (Qi−SSi) between the ink consumption amount Qi obtained in S132 and the ink volume SSi from the ink volume SKi, sets the ink volume SSi to 0, and the sets the flag FLAGi for the color i to "ON." Namely, the controller 130 updates the ink volume SKi according to the following formula (14).

$$SKi=SKi-(Qi-SSi) \quad (14)$$

The controller 130 reaches S139 after executing S137 or S138. Subsequently, the controller 130 determines whether there is an unprocessed color among the four colors (S139). In response to determining that there is an unprocessed color (S139: Yes), the controller 130 goes back to S131. Meanwhile, in response to determining that there are no unprocessed colors (i.e., the processing has been completed for all the four colors) (S139: No), the controller 130 proceeds to S140.

In S140, the controller 130 determines whether the instruction determined in S16 (see FIG. 9A) to be the ink consumption instruction is a charging-target instruction. For instance, normal print instructions are included in charging-target instructions. However, print instructions and purge instructions for managing the printer 10 are not included in the charging-target instructions. In response to determining that the instruction determined to be the ink consumption instruction is a charging-target instruction (S140: Yes), the controller 130 proceeds to S141.

At the time when the controller 130 has reached S141, the four flags FLAGk, FLAGy, FLAGc, and FLAGm have been set to "ON" or "OFF." In S141, the controller 130 determines whether at least one of the four flags is "ON." In response to determining that at least one of the four flags is "ON" (S141: Yes), the controller 130 proceeds to S142. In this case, the controller 130 sets the charging flag to "ON" (S142).

In response to determining in S140 that the instruction determined to be the ink consumption instruction is not a charging-target instruction (S140: No) or determining in S141 that all the four flags are "OFF" (S141: No), the controller 130 proceeds to S143. In this case, the controller 130 sets the charging flag to "OFF" (S143).

After the completion of S142 or S143, the controller 130 terminates the sub tank remaining volume calculation process at time of ink consumption. Thereafter, the controller 130 returns to just after the completion of S20 (see FIG. 9B).

In S132, the controller 130 obtains the ink consumption amount Qi for the color i and the ink change amount Ri of the cartridge 200 for the color i. The ink consumption amount Qi is a positive value. The ink change amount Ri is equal to an amount of ink flowing into the sub tank 160 for the color i. In the sub tank remaining volume calculation process at time of ink consumption, the controller 130 adds the ink change amount Ri to the ink volume SKi or SSi according to the type of the cartridge 200 (S134, S135).

In S136, the controller 130 determines whether the ink volume SSi is equal to or more than the ink consumption amount Qi (in other words, whether the amount of ink supplied from the commercial cartridge for the color i and stored in the sub tank 160 for the color i is sufficient to cover the amount of ink consumed this time). In the illustrative embodiment, it is assumed that if the amount of ink supplied from the commercial cartridge for the color i and stored in the sub tank 160 for the color i is sufficient to cover the amount of ink consumed this time, only the ink supplied from the commercial cartridge for the color i and stored in the sub tank 160 for the color i will be consumed. Moreover, it is assumed that if the amount of ink supplied from the commercial cartridge for the color i and stored in the sub tank 160 for the color i is insufficient to cover the amount of ink consumed this time, all the ink supplied from the commercial cartridge for the color i and stored in the sub tank 160 for the color i will be consumed, and then the ink supplied from the contract cartridge for the color i and stored in the sub tank 160 for the color i will be consumed for an insufficient amount of ink.

When determining that the amount of ink supplied from the commercial cartridge for the color i and stored in the sub tank 160 for the color i is sufficient to cover the amount of ink consumed this time (S136: Yes), the controller 130 subtracts the ink consumption amount Qi from the ink volume SSi (S137). The user has already paid for the ink consumed this time (i.e., the ink supplied from the commercial cartridge). Therefore, the controller 130 sets the flag FLAGi for the color i to "OFF" (no charge).

When determining that the amount of ink supplied from the commercial cartridge for the color i and stored in the sub tank 160 for the color i is insufficient to cover the amount of ink consumed this time (S136: No), the controller 130 sets the ink volume SSi to 0, and subtracts an insufficient amount of ink (Qi−SSi) from the ink volume SKi (S138). The ink consumed this time includes ink supplied from the contract cartridge. Therefore, the controller 130 sets the flag FLAGi for the color i to "ON" (charged).

In response to determining that the instruction determined to be the ink consumption instruction is a charging-target instruction (S140: Yes) and that the ink supplied from the contract cartridge has been consumed with respect to at least one of the four colors (S141: Yes), the controller 130 sets the charging flag to "ON" (charged). In response to determining that the ink supplied from the contract cartridge for at least one of the four colors has been consumed in the "sub tank remaining volume calculation process at time of ink consumption," the controller 130 sets the charging flag to "ON."

Thus, in response to receiving the ink consumption instruction when in the contract mode, the controller 130 performs the following update processes. In response to determining that the contract cartridge is attached to the attachment case 150 for the color i (S133: Contract Cartridge), the controller 130 adds, to the ink volume SKi, the ink change amount Ri that is the change in the amount of ink stored in the contract cartridge, thereby updating the ink volume SKi (S134). In response to determining that the commercial cartridge is attached to the attachment case 150 for the color i (S133: Commercial Cartridge), the controller 130 adds, to the ink volume SSi, the ink change amount Ri that is the change in the amount of ink stored in the commercial cartridge, thereby updating the ink volume SSi (S135). The controller 130 calculates the ink consumption amount Qi that is the sum of the change (Vci−Vci') in the amount of ink stored in the cartridge 200 for the color i that is attached to the attachment case 150 for the color i and the change (Vsi−Vsi') in the amount of ink stored in the sub tank 160 for the color i (S132). In response to determining that the ink volume SSi is equal to or more than the ink consumption amount Qi (S136: Yes), the controller 130 subtracts the ink consumption amount Qi from the ink volume SSi, thereby updating the ink volume SSi (S137). In response to determining that the ink volume SSi is less than the ink consumption amount Qi (S136: No), the controller 130 subtracts the difference (Qi−SSi) between the ink consumption amount Qi and the ink volume SSi from the ink volume SSi, and updates the ink volume SSi to 0 (S138). Thus, the controller 130 is enabled to update the ink volumes SKk, SKy, SKc, and SKm and the ink volumes SSk, SSy, SSc, SSc, and SSm in response to causing the head 21 to eject ink from the nozzles 29.

In the above update processes, in response to determining that the ink volume SSi is equal to or more than the ink consumption amount Qi (S136: Yes), the controller 130 sets the flag FLAGi for the color i to "OFF" (S137). Meanwhile, in response to determining that the ink volume SSi is less than the ink consumption amount Qi (S136: No), the controller 130 sets the flag FLAGi for the color i to "ON" (S138). Thus, the controller 130 is enabled to set the charging flag in response to causing the head 21 to eject ink from the nozzles 29.

[Other Operations by Controller]

As described above, in the contract mode, the controller 130 separately stores in the EEPROM 134 the ink volume SKi that is, when the contract cartridge for the color i is attached to the attachment case 150 for the color i, the amount of the ink supplied from the contract cartridge for the color i and stored in the sub tank 160 for the color i, and the ink volume SKi that is, when the commercial cartridge for the color i is attached to the attachment case 150 for the color i, the amount of the ink supplied from the commercial cartridge for the color i and stored in the sub tank 160 for the color i. In the non-contract mode, the controller 130 stores in the EEPROM 134 both the ink volume SKi and the ink volume SSi as a single volume. Thus, it is possible to simplify the processing of the controller 130 in the non-contract mode.

[Charging Server]

As shown in FIG. 7, the charging server 300 includes a CPU 301, a RAM 302, a memory 303, and a communication I/F 304. The communication I/F 304 is an interface for communication with the printer 10. The charging server 300 is configured to control the communication I/F 304, thereby communicating with the printer 10 via the communication network 350. The communication network 350 may include at least one of communication networks such as the Internet, a telephone line network, and a dedicated line network.

The memory 303 is configured to store charge information regarding a plurality of printers connected with the charging server 300 via the communication network 350. For instance, with respect to the printer 10 for which a contract has been concluded with the user, the memory 303 stores a contract number and the number of printed sheets in association with each other.

As described above, the controller 130 of the printer 10 sends a charging instruction to the charging server 300 in S22 (see FIG. 9B). The charging instruction includes a contract number and information indicating that the printer 10 has performed printing for one sheet. The charging instruction may further include information indicating the printing date and time, and the size and type of the printed sheet.

In response to receiving the charging instruction from the printer 10 via the communication I/F 304, the CPU 301 of the charging server 300 obtains the contract number from the received charging instruction. The CPU 301 adds a value of 1 to the number of printed sheets that is associated with the obtained contract number among the numbers of sheets printed that are stored in the memory 303. Thereby, the CPU 301 obtains the number of sheets printed by the printer 10 for which the contract has been concluded with the user. An administrator of the charging server 300 sends to the user of the printer 10 a request for payment according to the number of sheets printed in a particular period of time (e.g., one month). For instance, when the number of sheets printed in the particular period of time exceeds a contracted number of sheets printable in the same period of time, the administrator of the charging server 300 sends to the user of the printer 10 a request for payment for an excess by which the number of printed sheets exceeds the contracted number of printable sheets.

The charging instruction sent from the printer 10 to the charging server 300 is a trigger that causes the charging server 300 to perform a charging process. The charging server 300 may not always charge the user of the printer 10 when receiving the charging instruction, but has only to perform some process related to charging to the user of the printer 10 when receiving the charging instruction. It is noted that hereinafter, respective charging-related processes by the controller 130 of the printer 10 and the charging server 300 may be collectively referred to as a "charging process," or may be separately referred to as a "first charging process" and a "second charging process," respectively.

The controller 130 of the printer 10 causes the display 17 to show that charging is performed, and sends a charging instruction to the charging server 300. In response to receiving the charging instruction from the controller 130 of the printer 10, the charging server 300 updates the number of printed sheets that is associated with the contract number contained in the received charging instruction.

Operations and Advantageous Effects of Illustrative Embodiment

In the printer 10 of the aforementioned illustrative embodiment, when the contract cartridges are attached to the corresponding attachment cases 150 in the contract mode, the controller 130 stores in the EEPROM 134 the ink volumes SKk, SKy, SKc, and SKm that are the amounts of ink supplied from the contract cartridges and stored in the corresponding sub tanks 160. Further, when the commercial cartridges are attached to the corresponding attachment cases 150, the controller 130 stores in the EEPROM 134 the ink volumes SSk, SSy, SSc, and SSm that are the amounts of ink supplied from the commercial cartridges and stored in the corresponding sub tanks 160. Thus, since the charging process is performed based on the above ink volumes, it is possible to prevent the user from suffering disadvantages when the user replaces a cartridge with ink remaining in the corresponding sub tank 160. In particular, in the printer 10 in which the liquid surface level of the ink in each cartridge 200 becomes as high as the liquid surface level of the ink in each corresponding sub tank 160, it is possible to prevent the user from suffering disadvantages when the user replaces a cartridge 200 with ink remaining in the corresponding sub tank 160.

In response to the charging flag being "ON" after the execution of the above update processes, the controller 130 sends a charging instruction to the charging server 300. Thus, it is possible to switch whether or not to perform the charging process depending on the value of the charging flag. In addition, the printer 10 has the plurality of attachment cases 150, to each of which the cartridge 200 for a corresponding one of the plurality of colors (e.g., four colors in the aforementioned illustrative embodiment) is attachable. The EEPROM 134 stores the four flags corresponding to the four colors. The controller 130 performs the above update processes for each of the plurality of cartridges 200 attached to the plurality of attachment cases 150. Further, the controller 130 sends the charging instruction to the charging server 300 in response to at least one of the four flags being "ON" after the execution of the above update processes. Thus, in the printer 10 to which the plurality of cartridges are attachable, it is possible to switch whether or not to perform the charging process depending on the value of the charging flag.

The printer 10 includes the display 17 to provide a notification about the execution of charging. In the charging process, the controller 130 causes the display 17 to provide the notification about the execution of charging. Thus, the user is notified of the execution of charging. Further, the printer 10 includes the communication I/F 140. In the charging process, the controller 130 sends the charging instruction to perform charging to the charging server 300 via the communication I/F 140. Thus, the printer 10 is enabled to instruct the charging server 300 connected therewith to perform charging.

In response to the charging flag set by the printer 10, the controller 130 of the printer 10 sends the charging instruction. Then, in response to receiving the charging instruction from the printer 10, the charging server 300 updates the number of printed sheets. Thereby, the printer 10 and the charging server 300 are enabled to share the charging process with each other to perform the charging process.

While aspects of the present disclosure have been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiment(s) according to aspects of the disclosure, as set forth above, are intended to be illustrative of the inventive concepts, and not limiting the inventive concepts. Various changes may be made without departing from the spirit and scope of the inventive concepts as expressed herein. Therefore, the disclosure is intended to embrace all known or later developed alternatives, modifications, variations, improvements, and/or substantial equivalents. Some specific examples of potential alternatives, modifications, or variations according to aspects of the disclosure are provided below.

[Modifications]

In the aforementioned illustrative embodiment, an example has been described in which the printer 10, to which the plurality of cartridges 200 for the plurality of colors are attachable, has the plurality of sub tanks 160. However, in a modification according to aspects of the present disclosure, the printer 10, to which a single cartridge 200 for a single color may be attachable, may have a single sub tank 160.

In the aforementioned illustrative embodiment, the controller 130 of the printer 10 performs the ink volume calculation processes as shown in FIGS. 10 and 11, thereby obtaining the ink volume Vci of the ink stored in the liquid chamber 210 of the cartridge 200 for the color i, and the ink volume Vsi of the ink stored in the liquid chamber 171 of the sub tank 160 for the color i. Instead, the controller 130 may perform processes other than the ink volume calculation processes shown in FIGS. 10 and 11, thereby obtaining the ink volumes Vci and Vsi. For instance, the controller 130 may calculate the ink volume Vsi from the total ink volume Vti based on not two functions but one function. In another instance, the controller 130 may calculate the ink volume Vci from the total ink volume Vti based on a function expressing a relationship between the total ink volume Vti and the ink volume Vci for the color i. In this case, the controller 130 may calculate the ink volume Vsi by subtracting the ink volume Vci from the total ink volume Vti.

In the aforementioned illustrative embodiment, the controller 130 performs a first charging process that includes showing that charging is performed, and sending a charging instruction. Further, the charging server 300 performs a second charging process that includes updating the number of printed sheets. Instead, the controller 130 may perform a first charging process different from than the above first charging process. Further, the charging server 300 may perform a second charging process different from the above second charging process. For instance, instead of causing the display 17 to show that charging is performed, the controller 130 may provide substantially the same notification as the above information by sound or by turning on a lamp. Further, the controller 130 may send a charging instruction that includes the printing date and time, and/or the size and type of the sheet printed. In response to receiving such a charging instruction, the charging server 300 may update the number of printed sheets for each sheet size and each sheet type.

In the aforementioned illustrative embodiment, the controller 130 stores in the EEPROM 134 the ink volumes SKk, SKy, SKc, and SKm and the ink volumes SSk, SSy, SSc, and SSm, and determines whether to perform charging based on the ink volumes SKk, SKy, SKc, SKm, SSk, SSy, SSc, and SSm stored in the EEPROM 134. Instead, the controller 130 stores in the EEPROM 134 the ink volumes SKk, SKy, SKc, and SKm and the ink volumes SSk, SSy, SSc, and SSm, but may not determine whether to perform charging. In this case, in response to a request from the charging server 300 (or at regular time intervals of a particular time period), the controller 130 may send to the charging server 300 the ink volumes SKk, SKy, SKc, and SKm and the ink volumes SSk, SSy, SSc, and SSm. Further, in this case, the charging server 300 may determine whether to perform charging based on the ink volumes SKk, SKy, SKc, SKm, SSk, SSy, SSc, and SSm received from the printer 10.

In the aforementioned illustrative embodiment, the controller 130 stores data into the EEPROM 134 immediately after obtaining or calculating the data. Instead, for instance, the controller 130 may store in the RAM 133 data that does not need to be kept stored when the printer 10 is powered off among the obtained or calculated data. In another instance, the controller 130 may once store the obtained or calculated data in the RAM 133, and may store the data read out from the RAM 133 into the EEPROM 134 when the printer 10 is powered off.

In the aforementioned illustrative embodiment, the controller 130 stores the ink volumes SKi and SSi in a memory (specifically, writes the ink volumes SKi and SSi into the EEPROM 134) when the cartridges 200 have been attached (see S115, S116, S118, S119 in FIG. 12) or when ink has been consumed (see S134, S135, S137, S138 in FIG. 13). However, the controller 130 may store the ink volumes SKi and SSi in the memory at timings other than the above timings. For instance, the controller 130 may store the ink volumes SKi and SSi in the memory at a timing at which the liquid level signal output from the liquid level sensor 155 changes from the low level to the high level due to ink volatilization.

The following shows examples of associations between elements exemplified in the aforementioned illustrative embodiment and modifications, and elements according to aspects of the present disclosure. For instance, the system 1 may be an example of a "system" according to aspects of the present disclosure. The image recording apparatus 10 may be an example of an "image recording apparatus" according to aspects of the present disclosure. The charging server 300 may be an example of a "server" according to aspects of the present disclosure. The attachment cases 150 may be included in examples of an "attachment case" according to aspects of the present disclosure. The sub tanks 160 may be included in examples of a "tank" according to aspects of the present disclosure. The head 21 may be an example of a "head" according to aspects of the present disclosure. The nozzles 29 may be included in examples of a "nozzle" according to aspects of the present disclosure. The ROM 132, the RAM 133, and the EEPROM 134 may be included in examples of a "memory" according to aspects of the present disclosure. The display 17 may be an example of a "notification device" according to aspects of the present disclosure. The communication I/F 140 may be an example of a "communication interface" according to aspects of the present disclosure. The contract cartridge may be an example of a "first cartridge" according to aspects of the present disclosure. The commercial cartridge may be an example of a "second cartridge" according to aspects of the present disclosure. The contract mode may be an example of a "first mode" according to aspects of the present disclosure. The non-contract mode may be an example of a "second mode" according to aspects of the present disclosure. The ink volumes SKk, SKy, SKc, and SKm may be included in examples of a "first tank liquid volume" according to aspects of the present disclosure. The ink volumes SSk, SSy, SSc, and SSm may be included in examples of a "second tank liquid volume" according to aspects of the present disclosure.

What is claimed is:

1. An image recording apparatus comprising:

an attachment case configured to support a cartridge attached thereto of a plurality of different types of attachable cartridges, the plurality of different types of cartridges including a first cartridge and a second cartridge;

a tank configured to store liquid supplied from the cartridge attached to the attachment case;

a head connected with the tank, the head having a nozzle configured to eject the liquid;

a memory; and a controller configured to:

make a transition of an operational mode of the controller between a first mode and a second mode, the first mode representing an operational state where a contract for a service using the first cartridge has been made, the second mode representing an operational state where the contract for the service has not been made; and in the first mode, store a first tank liquid volume and a second tank liquid volume in the memory, the first tank liquid volume representing, when the first cartridge is attached to the attachment case, an amount of liquid supplied from the first cartridge and stored in the tank, the second tank liquid volume representing, when the second cartridge is attached to the attachment case, an amount of liquid supplied from the second cartridge and stored in the tank.

2. The image recording apparatus according to claim 1, wherein the controller is further configured to:

identify a type of the cartridge attached to the attachment case based on a signal obtained from the cartridge attached to the attachment case;

in the first mode, in response to the cartridge attached to the attachment case being identified as the first cartridge, update the first tank liquid volume based on information obtained from the first cartridge; and in the first mode, in response to the cartridge attached to the attachment case being identified as the second cartridge, update the second tank liquid volume based on information obtained from the second cartridge.

3. The image recording apparatus according to claim 2, wherein the controller is further configured to perform an update process in response to receiving, in the first mode, an instruction to cause the head to eject the liquid from the nozzle, the update process comprising:

in response to the cartridge attached to the attachment case being identified as the first cartridge, adding to the first tank liquid volume a first cartridge change amount representing a change in the amount of liquid stored in the first cartridge, thereby updating the first tank liquid volume;

in response to the cartridge attached to the attachment case being identified as the second cartridge, adding to the second tank liquid volume a second cartridge change amount representing an amount of a change in the amount of liquid stored in the second cartridge, thereby updating the second tank liquid volume;

calculating a consumption amount that is a sum of a cartridge change amount and a tank change amount, the cartridge change amount representing a change in an amount of liquid stored the cartridge attached to the attachment case, the tank change amount representing a change in the amount of liquid stored in the tank;

in response to the second tank liquid volume being equal to or more than the consumption amount, subtracting the consumption amount from the second tank liquid volume, thereby updating the second tank liquid volume; and in response to the second tank liquid volume being less than the consumption amount, subtracting, from the first tank liquid volume a difference between the consumption amount and the second tank liquid volume, and updating the second tank liquid volume to zero.

4. The image recording apparatus according to claim 3, wherein the memory stores a flag settable to any one of a first value and a second value, wherein the update process further comprising:

in response to the second tank liquid volume being equal to or more than the consumption amount, setting the flag to the second value; and in response to the second tank liquid volume being less than the consumption amount, setting the flag to the first value, and wherein the controller is further configured to perform a charging process in response to the flag being the first value after the update process has been performed.

5. The image recording apparatus according to claim 4, further comprising a plurality of attachment cases including the attachment case, each attachment case being configured to support a cartridge attached thereto that corresponds to a specific one of a plurality of different colors, wherein the memory stores a plurality of flags including the flag, each flag corresponding to a specific one of the plurality of different colors, and wherein the controller is further configured to:

perform the update process for each of the respective cartridges attached to the plurality of attachment cases; and perform the charging process in response to at least one of the plurality of flags being the first value after the update process has been performed for all the respective cartridges attached to the plurality of attachment cases.

6. The image recording apparatus according to claim 4, further comprising a notification device, wherein the controller is further configured to cause, in the charging process, the notification device to provide a notification about execution of charging.

7. The image recording apparatus according to claim 4, further comprising a communication interface configured to perform communication with a server, wherein the controller is further configured to send, in the charging process, an instruction to perform charging to the server via the communication interface.

8. The image recording apparatus according to claim 1, wherein the controller is further configured to, in the second mode, store in the memory both the first tank liquid volume and the second tank liquid volume as a single volume.

9. The image recording apparatus according to claim 1, wherein a liquid surface level of the liquid stored in the cartridge attached to the attachment case is as high as a liquid surface level of the liquid stored in the tank.

* * * * *